(12) United States Patent
Richards et al.

(10) Patent No.: US 11,100,235 B2
(45) Date of Patent: Aug. 24, 2021

(54) BACKUPS OF FILE SYSTEM INSTANCES WITH ROOT OBJECT ENCRYPTED BY METADATA ENCRYPTION KEY

(71) Applicant: HEWLETT PACKARD ENTERPRISE DEVELOPMENT LP, Houston, TX (US)

(72) Inventors: Gareth David Richards, Woodstock (GB); Glenn S. Watkins, Northborough, MA (US); John Michael Czerkowicz, Wakefield, MA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 303 days.

(21) Appl. No.: 16/397,661

(22) Filed: Apr. 29, 2019

(65) Prior Publication Data
US 2020/0342117 A1    Oct. 29, 2020

(51) Int. Cl.
| | |
|---|---|
| *G06F 21/60* | (2013.01) |
| *G06F 11/14* | (2006.01) |
| *G06F 21/62* | (2013.01) |
| *H04L 9/32* | (2006.01) |
| *G06F 16/901* | (2019.01) |
| *H04L 9/08* | (2006.01) |

(52) U.S. Cl.
CPC ........ *G06F 21/602* (2013.01); *G06F 11/1448* (2013.01); *G06F 16/9027* (2019.01); *G06F 21/6218* (2013.01); *H04L 9/0822* (2013.01); *H04L 9/3236* (2013.01); *H04L 9/3247* (2013.01)

(58) Field of Classification Search
CPC .............. G06F 21/602; G06F 11/1448; G06F 21/6218; G06F 16/9027; G06F 16/122; H04L 9/3236; H04L 9/3247; H04L 9/0822; H04L 9/3239; H04L 2209/38
USPC ........................................................ 713/189
See application file for complete search history.

(56) References Cited

U.S. PATENT DOCUMENTS

| | | | |
|---|---|---|---|
| 8,126,847 | B1 | 2/2012 | Zheng et al. |
| 8,397,083 | B1 | 3/2013 | Sussland et al. |
| 8,452,731 | B2 | 5/2013 | Preslan et al. |
| 8,555,088 | B2 | 10/2013 | Saarinen et al. |
| 8,745,523 | B2 | 6/2014 | McInerney et al. |
| 9,195,851 | B1 * | 11/2015 | Chandra ............... H04L 9/0825 |

(Continued)

OTHER PUBLICATIONS

F. Tseng, J. K. Zao, Y. Liu and F. Kuo, "Halo: A Hierarchical Identity-Based Public Key Infrastructure for Peer-to-Peer Opportunistic Collaboration," 2009 Tenth International Conference on Mobile Data Management: Systems, Services and Middleware, 2009, pp. 672-679, doi: 10.1109/MDM.2009.115. (Year: 2009).*

(Continued)

*Primary Examiner* — Kambiz Zand
*Assistant Examiner* — Aubrey H Wyszynski
(74) *Attorney, Agent, or Firm* — Hewlett Packard Enterprise Patent Department

(57) ABSTRACT

Example implementations relate to encrypting data objects. In an example, data objects of a file system instance contained by a security domain are encrypted using a Data Encryption Key that is specific to the security domain and is wrapped by a Key Encryption Key shared exclusively within a cluster. A root object of the file system instance is encrypted using a Metadata Encryption Key. A backup of the file system instance is created on a backup node. The Data Encryption Key and the Metadata Encryption Key are sent to the backup node.

20 Claims, 11 Drawing Sheets

(56) References Cited

U.S. PATENT DOCUMENTS

| | | | |
|---|---|---|---|
| 9,432,192 | B1 | 8/2016 | Pogde et al. |
| 9,571,278 | B1 | 2/2017 | Harwood et al. |
| 9,749,132 | B1 | 8/2017 | Hamllton |
| 2011/0083164 | A1 | 4/2011 | Benantar et al. |
| 2012/0204030 | A1* | 8/2012 | Nossik ............... H04L 9/0897 713/168 |
| 2014/0359309 | A1 | 12/2014 | Cachin et al. |
| 2016/0034719 | A1* | 2/2016 | Choi ................ G06F 21/6218 713/193 |
| 2019/0097791 | A1* | 3/2019 | Hersans ............. G06F 12/0875 |
| 2019/0305938 | A1* | 10/2019 | Sandberg-Maitland ................. H04L 9/321 |
| 2020/0053065 | A1* | 2/2020 | Wisniewski ......... H04L 9/0822 |

OTHER PUBLICATIONS

Morris Dworkin, "Recommendation for Block Cipher Modes of Operation: The XTS-AES Mode for Confidentiality on Storage Devices", NIST Special Publication 800-38E, Jan. 2010, 12 pages.

Aameek Singh and Ling Liu, "Sharoes: a Data Sharing Platform for Outsourced Enterprise Storage," Apr. 2008, pp. 1-10, IEEE.

Commvault Systems Inc., "Overview: Delete Backup and Archive Data," 2019, pp. 1-2 (online), Retrieved from the Internet on Feb. 25, 2019 at URL: <documentation.commvault.comm/commvault/v11_sp9/article?p=features/erase_data/erase_data.htm>.

Dan Boneh and Richard Lipton, "A Revocable Backup System," Jul. 1996, pp. 1-7, Princeton University, Princeton, New Jersey, USA.

Deric Horn, "What's New in the File System," May 23, 2018, pp. 1-110, Session 709, WWDC2012.

Nesrine Kaaniche and Maryline Laurent, "A Secure Client Side Deduplication Scheme in Cloud Storage Environments," May 12, 2014, pp. 1-8, Institut Mines-Telecom, France.

Tibco Software Inc., "Data Encryption," 2019, 1-page (online), Retrieved from the Internet on Feb. 25, 2019 at URL: <docs.tibco.com/pub/activespaces/2.2.0/doc/html/GUID-23E77869-EB66-4C7F-A9F6-7464B241CC9C.html>.

* cited by examiner

BACKUPS OF FILE SYSTEM INSTANCES WITH ROOT OBJECT ENCRYPTED BY METADATA ENCRYPTION KEY

BACKGROUND

Computing systems may store data. Some example computing systems may operate data virtualization platforms that control how data is stored. The data may be encrypted for privacy and security purposes. Computing systems may create backups of data to protect against loss.

BRIEF DESCRIPTION OF THE DRAWINGS

Various examples will be described below with reference to the following figures.

Figure 1:
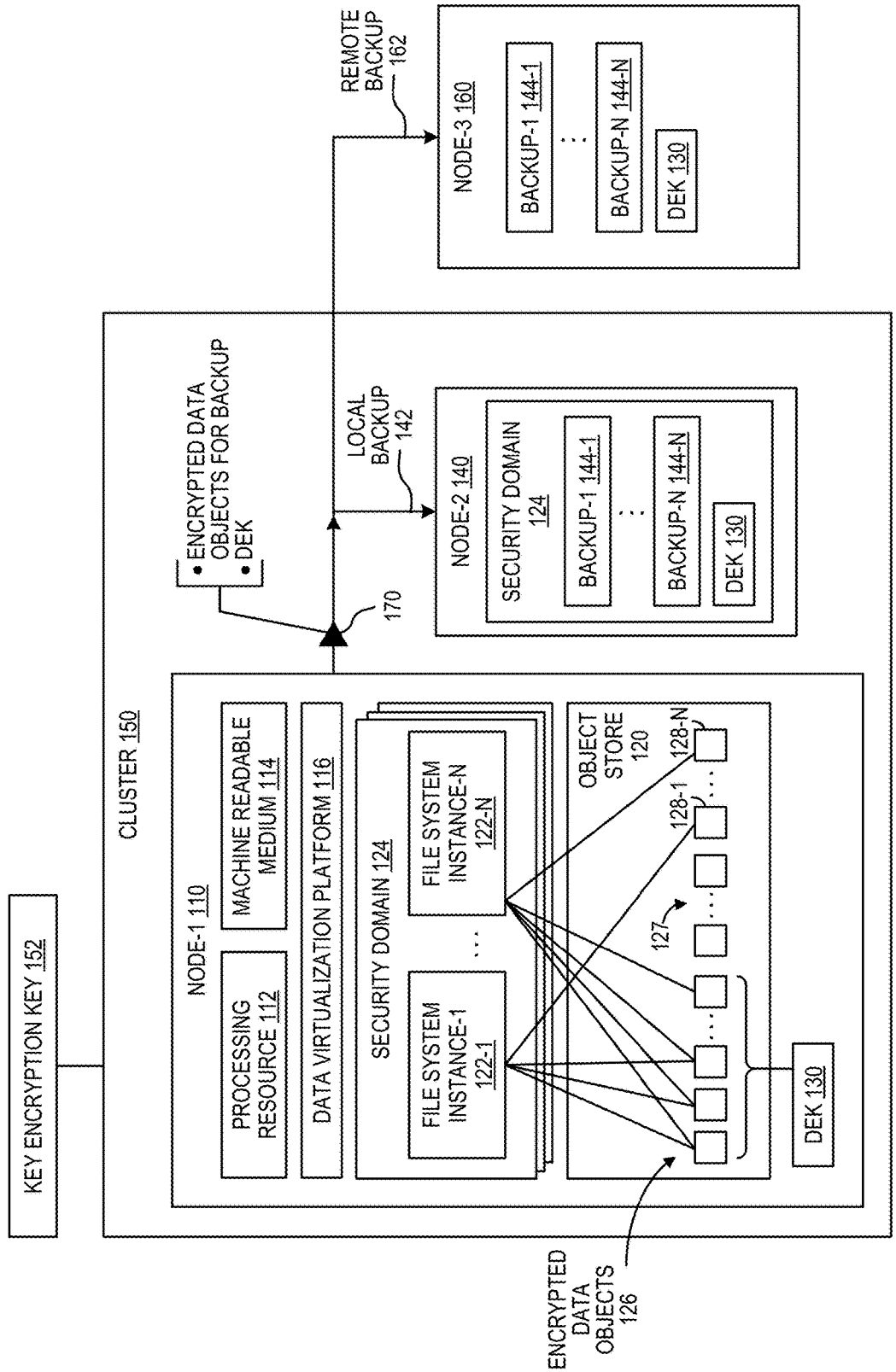
FIG. 1 depicts an example environment where a node may create backups of file system instances with encrypted data objects.

Throughout the drawings, identical reference numbers may designate similar, but not necessarily identical, elements. Throughout the drawings, a hyphenated index number "N" appended to some of the reference numerals may be understood to merely denote plurality and may be replaced by an integer to provide a particular example. Additionally, use herein of a reference numeral without a hyphenated index number, where such reference numeral is referred to elsewhere with a hyphenated index number, may be a general reference to the corresponding plural elements, collectively or individually.

DETAILED DESCRIPTION

Data may be stored on computing systems, such as servers, computer appliances, workstations, storage systems or storage arrays, converged or hyperconverged systems, or the like. Computing systems connected by a network may also be referred to as nodes and vice versa. To store data, some computing systems may utilize a data virtualization platform that abstracts aspects of the physical storage hardware on which the data is physically stored (e.g., aspects such as addressing, configurations, etc.) and presents virtualized or logical storage to a user environment (e.g., to an operating system, applications, processes, etc.). The virtualized storage may be pooled from multiple storage hardware (e.g., hard disk drives, solid state drives, etc.) into a data store, out of which the virtualized or logical storage may be provided. The data virtualization platform may also provide data services such as deduplication, compression, replication, and the like.

In some implementations, the data virtualization platform may be instantiated, maintained, and managed by, at least in part, a virtual controller. A virtual controller may be a virtual machine (VM) executing on hardware resources, such as a processor and memory, with specialized processor-executable instructions to establish and maintain virtualized storage according to various examples described herein. In such instances, the virtual controller may be operating alongside guest virtual machines (also called client or user virtual machines), and on a same hypervisor or virtual machine manager as the guest virtual machines for example.

In some instances, the data virtualization platform may be object-based. An object-based data virtualization platform may differ from block level storage (e.g., implemented in storage area networks and presented via a storage protocol such as iSCSI or Fibre Channel) and file level storage (e.g., a virtual file system which manages data in a file hierarchy and is presented via a file protocol such as NFS or SMB/CIFS), although an object-based data virtualization platform may underlie block or file storage protocols in some implementations.

Components of an example object-based data virtualization platform may include a flat object store and one or more file system instances, among other things. Data may be stored as objects in the object store. For example, user accessible files and directories may be made up of multiple data objects. The object store may also store metadata objects related to the operation of the data virtualization platform, as will be described below. In an example, objects may be of a predetermined fixed size in the object store (e.g., 4 kib or 8 kib for data objects and 1 kib for metadata objects). Each object may be identified by a signature (also referred to as an object fingerprint), which, in some implementations, may include a cryptographic hash digest of the content of that object. An object index can correlate the signature of an object in the object store to a physical address of the object's content (i.e., a physical address on storage hardware such as disk).

A file system instance may refer to an organization of metadata objects and data objects that relate the data objects hierarchically to a root object. Thus, a file system instance may be identified by its root object. For example, the file system instance may be a Merkle tree or any other hierarchical arrangement (e.g., directed acyclic graphs, etc.). In the case of a hierarchical Merkle tree, data objects may be located at the lowest tree level of any branch (that is, most distant from the root object) and may also referred to as leaf data objects. A parent object includes as its content the signatures of child objects. For example, a parent object of leaf data objects is a metadata object that stores as its content the signatures of its child leaf data objects. The root object and other internal objects of a tree may also be metadata objects that store as content the signatures of respective child objects. A metadata object may be able to store a number of signatures that is at least equal to a branching factor of the hierarchical tree, so that it may hold the signatures of all of its child objects.

In example implementations, data of one or more guest virtual machines may be stored by one or more file system instances (e.g., one guest VM using storage from multiple file system instances, many guest VMs using storage from a file system instance, or any variation in between). In a particular example, each guest virtual machine may be associated with a respective file system instance on a one-to-one basis. The data virtualization platform may export a file protocol mount point (e.g., an NFS or SMB mount point) by which a guest virtual machine can access the storage provided by a file system instance via the namespace of the file protocol. In some implementations, objects in an object store may be referenced more than once in a single file system instance or may be referenced multiple times in file system instances. Thus, the multiply-referenced object can be stored once but referenced many times to provide deduplication.

File system instances and data objects thereof may be replicated from one computing system to another computing system to provide data protection. The process of replicating data may also be referred to as backing up data. For example, data may be replicated between two or more nodes in a cluster, and such replication may be deemed a local backup. In another example, data may be replicated from a source node to a remote node, and such replication may be deemed a remote backup. The remote node may be a node at a third-party backup service, a node in the public cloud, or a geographically separated node owned by the same entity that owns the source node. A series of snapshots may capture a file system instance at various points in time and these snapshots can be backed up as a series of backups.

Stored data may be encrypted to provide security, confidentiality, and privacy. Data may be encrypted using an encryption algorithm and an encryption key. In some instances, including compliance with governmental standards or corporate policies, the deletion of encrypted data must ensure that the data cannot be recovered.

Thus, it may be useful to provide for secure backups of encrypted data while still enabling data efficiencies from deduplication and compression. Examples described herein may relate to hierarchical file system instances being contained and isolated in a security domain. Those file system instances may be made secure by encrypting constituent data objects using a Data Encryption Key (DEK) that is specific to the security domain. The DEK is wrapped (i.e., encapsulated by symmetric encryption) by a Key Encryption Key (KEK) shared exclusively by the nodes in a particular cluster, which limits the nodes trusted to access the secure data. In some implementations, encryption of the data objects may also use encryption algorithm tweak values based on for example, respective positions of the data objects in the file system instance (e.g., positions based on the hierarchical relationships in the file system instance), such that the tree structure of the file system instance needs to be known to decrypt encrypted data objects.

A secure backup of the file system instance may be created on a local or remote backup node by replicating encrypted data objects to the backup node. The backup node cannot decrypt the backup unless the backup node is a member of the cluster and has access to the KEK to unwrap the DEK. By virtue of a Data Encryption Key being specific to a security domain and a Key Encryption Key being used exclusively by a cluster and nodes thereof, deduplication of encrypted data can be performed across backup file system instances associated with a same security domain but not across backup file system instances associated with different security domains, thus preventing intermingling of data outside of a security domain. Moreover, a DEK may be deleted to cryptographically erase a secure, encrypted file system instance and all related secure, encrypted backups in an efficient manner and without disturbing any unencrypted data or any file system instances and backups in other security domains. Thus, both security and deduplication may be achieved for a series of backups, such as in a series of snapshots of a file system.

Some examples relate to encrypting root objects of different file system instances with different Metadata Encryption Keys (MEK). By virtue of deleting a selected, a particular file system instance and any related backups may be cryptographically erased without disturbing other file system instances associated with the security domain. For example, MEKs may be useful for cryptographically erasing a particular snapshot in a series of snapshots. Additional advantages will be apparent in view of the following descriptions.

Referring now to the figures, FIG. 1 illustrates an example computing environment that includes a node-1 110 with a processing resource 112 and a machine readable medium 114. The node-1 110 may also be in communication with a wired and/or wireless network via a network interface. FIG. 1 also illustrates a node-2 140 and a node-3 160, each of which may include structure and functionality similar in many respects to the node-1 110 described herein, and may communicate with each other and with node-1 110 via a network. Each of the node-1 110, node-2 140, and node-3 160 may also be referred to as a computing system and each may be a server, a computer appliance, a workstation, a storage system, a storage array, a converged system, a hyperconverged systems, or the like.

The processing resource 112 may include a microcontroller, a microprocessor, central processing unit core(s), an application-specific integrated circuit (ASIC), a field programmable gate array (FPGA), etc. The machine readable medium 114 may be non-transitory (i.e., does not encompass transitory propagating signals) and may include random access memory (RAM), read-only memory (ROM), electrically erasable programmable read-only memory (EEPROM), flash memory, a hard disk drive, solid state disk, etc. The processing resource 112 may execute instructions (i.e., programming or software code) stored on the machine readable medium 114. Additionally or alternatively, the processing resource 112 may include electronic circuitry for performing the instructions and functionality described herein.

A data virtualization platform 116 may operate on the node-1 110. In some implementations, a data virtualization platform 116 may be instantiated by a virtual controller (e.g., a virtual machine) that itself may be implemented for example as instructions encoded on machine readable medium 114 and executed by the processing resource 112. The data virtualization platform may be object-based as described above, which may maintain file system instances backed by an object store 120. A file system instance may provide storage to a client such as a guest VM, operating system, or the like, which may be executing on the node-1 110 or on another computing system in communication with the data virtualization platform 116 of node-1 110 via a network. In some implementations, data of a guest VM, such as files and directors, may be stored in the object store 120 as data objects that are identifiable by content-based hash signatures and related in the file system instance of the guest VM in a hierarchical arrangement (e.g., a Merkle tree) to a root object. Although examples described herein may relate to guest VM data, it should be understood that the techniques described herein may also support other client environments, including non-virtualized environments.

The node-1 110 may be grouped together with one or more other nodes to form a cluster. For example, node-1 110 and node-2 140 share common membership in cluster 150. The cluster 150 may have a Key Encryption Key (KEK) 152 that is shared by all nodes in that cluster 150, including node-1 110 and node-2 140. In an environment where multiple clusters co-exist, each cluster may be associated with a different KEK. In other words, a given KEK is exclusive to an associated cluster and the nodes of that cluster. In some implementations, a node in the cluster 150 may retrieve the KEK 152 from a key management system (not shown) that may generate Key Encryption Keys. In some implementations, a KEK may be a 256-bit AES-256 key.

The cluster 150 may contain one or more security domains. A security domain is a container for secure file system instance(s). Said differently, one or more secure file system instances may belong to a security domain. In some examples, a security domain may be deemed a property of a file system instance or a VM associated with the file system instance. Each security domain is associated with a different Data Encryption Key (DEK). A DEK is used to encrypt data objects of the file system instances of the associated security domain. A DEK may be created for a security domain by the data virtualization platform 116 (e.g., a control plane of the data virtualization platform) when that security domain is created. In some implementations, a DEK may be a 512-bit XTS-AES-256 key. The DEK may be wrapped under the KEK of the cluster containing the security domain. Key wrapping, such as the wrapping of the DEK by the KEK, may be performed by a symmetric key encapsulation algorithm, for example.

The file system instances in a security domain may be, for example, snapshots of the data of a guest VM at different points in time. In some implementations, each snapshot is itself a file system instance. In another example, a security domain may contain file system instances of different guest VMs, which may also include snapshots for one or more of those different guest VMs in further examples. A security domain may be configured by a user or by policy. It may be understood that a security domain is a collection of file system instances to be encrypted by a same DEK.

In the example of FIG. 1, cluster 150 includes a security domain 124, which contains file system instances 122-1 through 122-N (also referred to generally or collectively as file system instance(s) 122). Other security domains may be operative on the node-1 110, as depicted by a stack under the security domain 124, and the node-1 110 may hold different DEKs for each of those additional security domains. The file system instances 122 are secure according to techniques described here, and the data objects 126 making up secure file system instances 122 are encrypted with DEK 130. Lines connecting some data objects 126 to some file system instances 122 illustrate, by way of example, that certain file system instances include certain data objects. In some implementations, the data objects 126 are encrypted using the DEK and respective tweak values that are based on a positions of the data objects within the file system instances 122 (e.g., position based on an inode number, inode tree number, offset, etc.), as will be described further herein below.

Each file system instance 122-1 through 122-N may be identified by a respective root object 128-1 through 128-N (also referred to generally or collectively as root object(s) 128), as illustrated for example by a line connecting file system instance 122-1 and root object 128-1 and a line connecting file system instance 122-N and root object 128-N. In an example implementation, the root objects 128 may remain unencrypted in a secure file system instance, while the root objects 128 may be encrypted in other implementations described below. A root object 128 of a file system instance 122 may be hierarchically related to the encrypted data objects 126 through internal metadata objects 127, forming a Merkle tree with branching factor N, for example. Although some internal metadata objects 127 form part of a file system instance 122, lines are not drawn in FIG. 1 for purposes of clarity. In some implementations, internal metadata objects 127 may remain unencrypted.

In an example, file system instances 122 on node-1 110 may each be snapshots of the data of a particular guest VM. In another example, some of the file system instances 122 may correspond to different guest VMs.

The node-1 110 may participate in creating a secure, encrypted backup of a file system instance 122 to another node (also referred to herein as a backup file system instance). For example, a local backup 142 may be created on node-2 140 in the cluster 150 (i.e., a local node) or a remote backup 162 may be created on node-3 160 (i.e., a remote node). Because node-2 140 is in the cluster 150, node-2 140 may include security domain 124 to contain the secure backup of the file system instance 122, and thus node-2 140 may be able to perform additional operations that involve access to at least the KEK and DEK, such as a backup restore for example, that a remote node, such as node-3 160, that is not part of the cluster 150 and does not include the security domain 124 may be unable to perform. The backups may preserve deduplication and compression by virtue of originating from the same security domain, as will be described below. A backup originating from the security domain 124 generally refers to a backup made of a file system instance 122 contained in the security domain 124. A backup originating from the security domain 124 may also be contained in the security domain 124 if the backup is on a local node such as node-2 140, and may be not contained in the security domain 124 if the backup is on a remote node such as node-3 160. Node-2 140 and node-3 160 may each operate a data virtualization platform similar to data virtualization platform 116 to store one or more backups.

For example, backup-1 144-1 through backup-N 144-N (also referred to generally or collectively as backup(s) 144) are backups or replicas of file system instance-1 122-1 through file system instance-N 122-N, respectively, and can be stored on node-2 140, node-3 160, or both node-2 140 and node-3 160, or other nodes not shown. The term backup, backup of file system instance, or backup file system instance may be used interchangeably herein. In some implementations, a backup 144 is a replica (e.g., an identical copy) of a source file system instance 122, and thus each of the backups 144 also may be hierarchical file system instances backed by an object store. In some implementations, the backup process may include sending 170 at least some of the encrypted data objects 126 and the DEK 130 to a backup node. Secure file system instances 122 and backups 144 may be cryptographically erased by deleting the associated DEK 130. Cryptographic erasure refers to no longer being able to decrypt data to a usable form, generally by virtue of destroying the associated key. The data of a cryptographically erased file system instance or backup may be subject to garbage collection process of the data virtualization platform 116.

Figure 2:
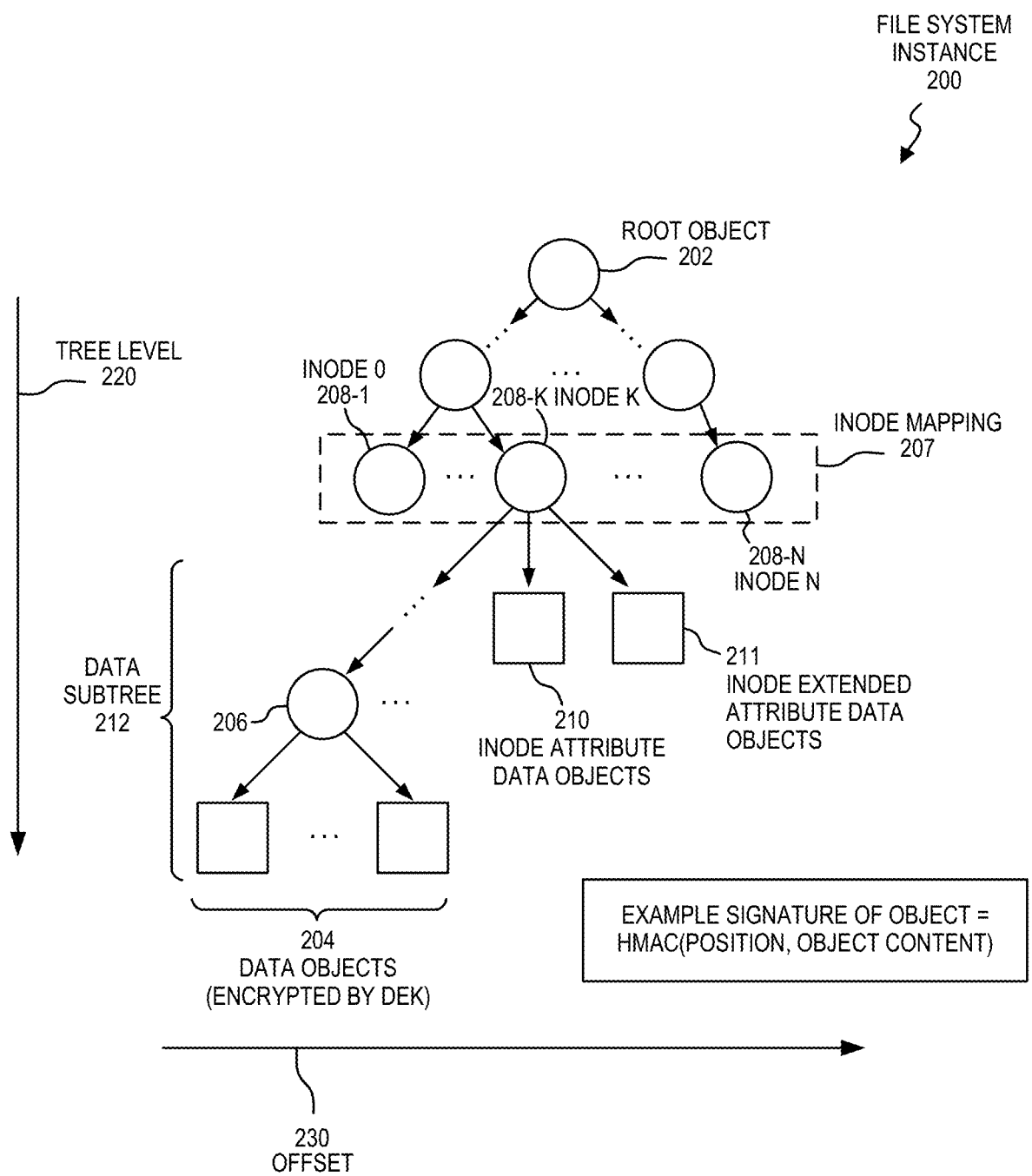
FIG. 2 depicts an example file system instance where data objects are encrypted using a Data Encryption Key.

FIG. 2 depicts an example file system instance 200. The file system instance 200 may be an example implementation of a file system instance 122 of FIG. 1. In FIG. 2, the file system instance 200 may include circular objects representing metadata objects and rectangular objects representing data objects. The metadata and data objects of the file system instance 200 may be maintained in an object store, such as object store 120.

The file system instance 200 is identified by a root object 202, which may be an example of the root objects 128 of FIG. 1. The file system instance 200 includes data objects 204, which may be examples of data objects 126 of FIG. 1. The file system instance 200 is in the form of a Merkle tree (also referred to as a hash tree) with a branching factor N, where the data objects 204 are located at a leaf level and are hierarchically related to the root object 202. In particular, content-based signatures of the data objects 204 are calculated and stored as content in an associated parent metadata object 206, a content-based signature of that parent metadata object 206 is calculated and stored in its parent metadata object, and so on until the root object 202 is reached. The metadata objects between the leaf data objects 204 and the root object 202, such as objects 206, 208 (described below), may be referred to as internal metadata objects, which may be examples of internal metadata objects 127 of FIG. 1.

A tree level 220 is a dimensional aspect of the file system instance 200 tree that represent how many levels away from the root object 202 a given object is (e.g., in increasing integer values, with the root being zero). An offset 230 into the file system instance 200 is a dimensional aspect that represents a position of an object at a given tree level (e.g., in increasing integer values from left to right), and may further be specified as either an offset into the entire file system instance 200 tree at a given tree level or an offset into a subtree 212 of the file system instance 200 at a given tree level.

The file system instance 200 also includes an inode mapping 207 that is a specialized level of metadata objects, each of which map or correspond to an inode at a user-level storage protocol above the file system instance 200 (e.g., an inode in a guest VM). An inode at the user-level storage protocol represents a file or a directory in, for example, a guest VM dataset. For example object 208-1 may map to an inode 0, object 208-K may map to an inode K, and object 208-N may map to an inode N. Thus, an inode number (e.g., 0 through N) is implicit in the position (i.e., in the offset 230 dimension) of an object in the tree at the inode mapping 207 level.

In some implementations, each of the inode metadata objects 208-1 through 208-N (also referred to generally or collectively as inode metadata object(s) 208) may reference data objects that store attribute and/or extended attribute data for that inode. Additionally, each of the inode metadata objects may reference a data subtree that hierarchically relates down to the data objects that comprise the data of the user-accessible file or directory corresponding to the inode number. The size of a data subtree may vary for different implementations. An inode tree number may be useful for identifying the type of child reference from an inode metadata object, including a data subtree (e.g., inode tree number 0), an attribute object (e.g., inode tree number 1), or an extended attribute object (e.g., inode tree number 2). To illustrate, FIG. 2 depicts inode metadata object 208-K for inode K referencing inode attribute data object 210 (inode tree number 1), inode extended attribute data object 211 (inode tree number 2), and a data subtree 212 (inode tree number 0) that ultimately relates down to data objects 204 via in part metadata object 206 that is a parent to the data objects 408.

Example implementations of secure backup and erase functionality of node-1 110 will now be described in FIGS. 3-6. In some implementations, the secure backup and erase functionality described herein may be implemented as instructions stored on machine readable medium 114 and executed by the processing resource 112, and more particularly, may be functionality of the data virtualization platform 116. Example implementation details may be described with reference back to FIGS. 1 and 2.

Figure 3:
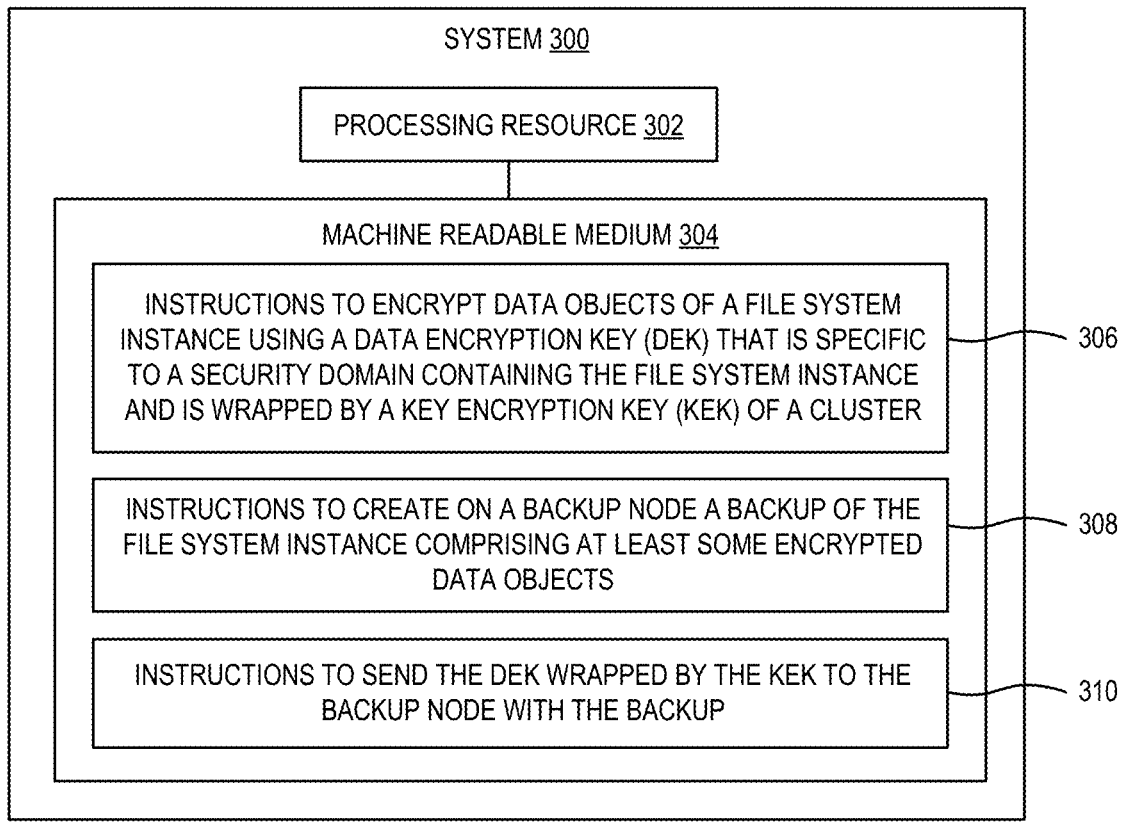
FIG. 3 depicts an example system with a machine readable medium that includes instructions to encrypt data objects using a Data Encryption Key and to create a backup of a file system instance having encrypted data objects.

FIG. 3 depicts an example system 300 with a machine readable medium 304 encoded with instructions 306, 308, 310 that are executable by a processing resource 302. System 300 may serve as or form part of node-1 110. The system 300 may belong to a cluster, such as cluster 150 of FIG. 1. The processing resource 302 and the machine readable medium 304 may be analogous in many respects to the processing resource 112 and the machine readable medium 114. The machine readable medium 304 may be non-transitory.

Instructions 306, when executed, cause the processing resource 302 to encrypt data objects of a file system instance (e.g., 122-1 or 200) to generate encrypted data objects (e.g., 126 or 204) using a DEK (e.g., 130) that is specific to the security domain (e.g., 124) that contains the file system instance. The types of data objects encrypted by instructions 306 may include data objects (e.g., 204) in an inode data subtree (e.g., 212), inode attribute data objects (e.g., 210), or inode extended attribute data objects (e.g., 211), using the DEK. The DEK is wrapped by a KEK (e.g., 152) shared exclusively within the cluster (e.g., 150). Instructions 306 may utilize XTS-AES encryption using the DEK, or alternatively, instructions 306 may utilize other encryption algorithms, such as Adiantum, which is based on ChaCha20 and Poly1305.

In some implementations, instructions 306 may encrypt data objects using the DEK and also using respective tweak values that are based on positions of the data objects in the file system instance. For example, the position of a data object may be based on an inode number, an inode tree number, an offset, or a tree level, as described above, or other dimensional or relational aspects of a tree, or any combination of the foregoing. In an example implementation, a position of a data object may be a mathematical combination (e.g., a sum) of an inode number (e.g., 0-N), an inode tree number (e.g., 0-2), and an offset (e.g., 0 for attribute and extended attribute data objects, and an integer in the offset 230 dimension for data subtree data objects). By virtue of encrypting data objects of a file system using respective positions, the structure of the file system instance must be known in order to decrypt any of the encrypted data objects, thus providing another security mechanism.

In some implementations, instructions 306 may be triggered upon a request to secure existing guest VM data corresponding to the file system instance, upon a request to create a new secure file system instance, or as new data objects are added to an existing secure file system instance.

In some implementations, the file system instance hierarchically relates the encrypted data objects located at a leaf level to a root object through references to signatures calculated based on the encrypted data objects, as described above with respect to FIG. 2. In some implementations, internal metadata objects of the file system instance between the root object and the encrypted data objects at the leaf level may be unencrypted.

Instructions 308, when executed, cause the processing resource 302 to create a backup (e.g., 144-1) of the file system instance (e.g., 122-1) comprising at least some of the encrypted data objects (e.g., 126). In particular, instructions 308 may create the backup on a backup node that is different from the system 300, such as a local node (e.g., 140) belonging to the same cluster as the system 300 or to a remote node (e.g., 160) outside of and remote to the cluster.

In some implementations, the backup node may also be operating a data virtualization platform that is the same as or compatible with the data virtualization platform of the system 300, and the backup node and system 300 may cooperate to perform the backup operation. Creating the backup may include replicating at least some of the encrypted data objects from the system 300 to the backup node, and in particular, replicating encrypted data objects that do not already exist on the backup node and not replicating encrypted data objects to the backup node for which respective signatures are found on the backup node. In particular, as will be described further below, not replicating encrypted data objects may be part of a deduplication process and may occur where other backups exist at the backup node, such as backups of other snapshots for the same guest VM data. In this manner, the backup process may be take advantage of deduplication properties and may be WAN efficient. Moreover, in some implementations, encrypted data objects are replicated to a backup node but internal metadata objects and root objects are not replicated, to reduce network traffic and to improve WAN efficiency. Instead, internal metadata objects and root objects may be reconstructed at the backup node by recalculating content and signature from the encrypted data objects, in a manner applicable for Merkle trees.

In an example implementation, instructions 308 may be triggered when system 300 makes a snapshot of guest VM data that results in a file system instance (e.g., 122-1) as the snapshot. Instructions 308 may subsequently create a backup (e.g., 144-1) of that file system instance to the backup node.

Instructions 310, when executed, cause the processing resource 302 to send the DEK wrapped by the KEK to the backup node. For example, as illustrated in FIG. 1, a copy of DEK 130 may be sent to and persisted on backup node-2 140 and/or backup node-3 160. The backup node cannot decrypt the backup unless the node belongs to the same cluster as the system 200 and has access to the KEK to unwrap the DEK. For example, if the backup node is remote to the cluster, that node does not have access to the KEK since it does not belong to the cluster, cannot unwrap the DEK without the appropriate KEK, and thus cannot decrypt the backup without the DEK. Thus, the backup remains secure outside of the cluster.

Figure 4:
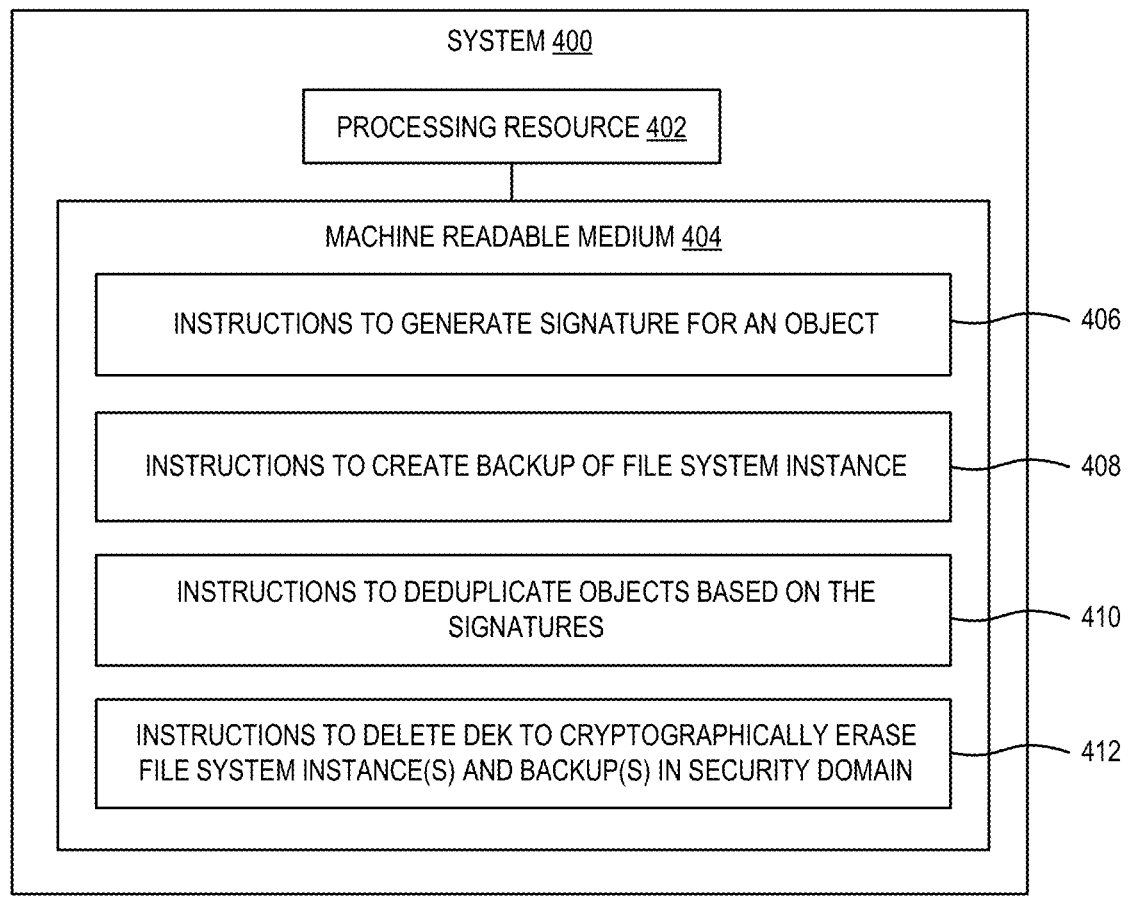
FIG. 4 depicts an example system with a machine readable medium that includes instructions to delete a Data Encryption Key to cryptographically erase file system instances and backups.

FIG. 4 depicts an example system 400 with a machine readable medium 404 encoded with instructions 404, 408, 410, 412 that are executable by a processing resource 402. System 400 may serve as or form part of node-1 110. In some examples, the instructions of system 400 may be implemented in combination with the instructions of system 300. The system 400 may belong to a cluster, such as cluster 150 of FIG. 1. The processing resource 402 and the machine readable medium 404 may be analogous in many respects to the processing resource 112 and the machine readable medium 114. The machine readable medium 404 may be non-transitory.

Instructions 406, when executed, cause the processing resource 402 to generate a signature for an object of the file system instance based on, for example, the content of the object. Instructions 406 may be used to calculate a signature for an encrypted data object (e.g., 126 or 204), an encrypted inode attribute or extended attribute data object (e.g., 210 or 211), an internal metadata object (e.g., 127, 206, 208), or a root object (e.g., 128 or 202). Thus, an encrypted data object or a metadata object can be identified by a corresponding signature generated by instructions 406.

In some implementations, generating a signature of an object may include, for example, calculating a cryptographic hash digest of that object, using a hash function such as SHA-1, SHA-256, MD5, etc. For example, an unencrypted data object (uncompressed or compressed) of a particular file system instance may be encrypted by instructions 306 using a DEK specific to the file system instance as described above (and also using a position, in some implementations), and then that encrypted data object may be passed to instructions 406 for calculation of a corresponding signature.

In some implementations, instructions 406 may calculate hash-based message authentication codes (HMACs) to serve as the signatures of objects. For example, calculating an HMAC signature for an object may involve concatenating the object with a key and calculating a cryptographic hash of the concatenation result. In some implementations, the key may be based on the position of the object in the file system instance, as indicated on FIG. 2. More particularly, the position of an encrypted data object may be, for example, analogous to the position used as an encryption tweak value in implementations described above, and may be based on an inode number, an inode tree number, and/or an offset. The position of the tree root may be zero, for example. The position of metadata objects may be based on, for example, a tree level and an offset. By virtue of using an object position to calculate the object signature and because file system instances do not store back pointer signatures, a file system instance cannot be reconstructed once the root object is deleted or cryptographically erase, an example of which will be described further herein with reference to FIG. 9 for example.

Instructions 408, when executed, cause the processing resource 402 to create a backup of a file system instance on a backup node. Certain features of instructions 408 may be similar in many respects to instructions 308. For example, in some implementations, instructions 408 may be triggered by a snapshot on the system 400 or by a backup request. Instructions 408 may create the backup on a local backup node or a remote backup node, by replicating at least some of the encrypted objects of the file system instance.

In some instances, instructions 408 may be executed to create an additional or subsequent backup of data in the security domain, where earlier backups or a series of backups in or originating from the security domain already exists. To illustrate with reference to FIG. 1, file system instance-1 122-1 may have been backed up previously as backup-1 144-1 on node-2 140 and/or node-3 160, and file system instance-1 122-1 and backup-1 144-1 may correspond to a first snapshot of guest VM data for example. At a later point in time, another snapshot of the guest VM data may be generated, resulting in a file system instance-N 122-N, for which instructions 408 can be executed to create a backup-N 144-N on node-2 140 and/or node-3 160. In another example, file system instance-1 122-1 and file system instance-N 122-N may not be snapshots of data of the same guest VM, but may be snapshots of data of different guest VMs.

In some implementations, the system 400 may be replicating data changes (e.g., of guest VM data) to the backup node on an ongoing basis, for high availability purposes for example. The ongoing replication may involve sending encrypted data objects to the backup node as they are written or modified on the system 400. In such instances, instructions 408 to create a backup may involve the system 400 creating a snapshot file system instance (e.g., 122-N) of the data and instructing the backup node to create a corresponding backup (e.g., 144-N) based on the data changes that were replicated on an ongoing basis since a last backup (e.g., 144-(N−1)).

Instructions 410, when executed, cause the processing resource 402 to deduplicate objects based on signatures of the objects (e.g., as generated by instructions 406). Deduplication may be performed for data objects and/or metadata objects. In some implementations, instructions 410 may perform inline deduplication, which may include, for example, comparing signatures of objects that are staged to be written to the object store against signatures of objects that are already stored in the object store and deciding to not write objects for which the same signatures already exist. Instead, the deduplicated file system instance may reference the existing objects using the existing signatures. In other implementations, instructions 410 may perform post-process deduplication, which may include removing objects from the object store having the same signature. Instructions 410 may be executed when creating a snapshot on a source node where the guest VM is running (e.g., node-1 110) or when creating a backup to a local backup node (e.g., node-2 140) or to a remote backup node (e.g., node-3 160).

Data security may be maintained while still preserving the ability to deduplicate data by virtue of different DEKs being used to encrypt data objects belonging to or originating from different security domains. In an example, data objects having identical unencrypted content but belonging to different file system instances of the same security domain will be encrypted using the same DEK, which may result in identical encrypted data objects, and those encrypted data objects may be hashed to produce identical signatures.

On the other hand, data objects having identical unencrypted content but belonging to different file system instances from different security domains are encrypted by different DEKs, resulting in encrypted data objects with different encrypted content, which in turn would result in different signatures generated by instructions 406. The different signatures would cause the data objects from different security domains to not be deduplicated across those different security domains, according to instructions 410, even though they have identical unencrypted content.

Moreover, if object position is used to encrypt objects and/or calculate object signatures as previously described with reference to instructions 306, then objects with identical unencrypted content would need to be at the same position within respective file system instances (such as snapshots) to be deduplicated in a security domain. In other words, if object position is used for encryption and signature calculation, objects with identical unencrypted content may not be deduplicated within a same file system instance and may not be deduplicated between file system instances from different security domains. However, deduplication may occur for objects with identical unencrypted content at the same position between file system instances from the same security domain.

An example where deduplication may occur, particularly when object position is used to encrypt objects and calculate signatures, is among backups of snapshots of secure data of the same guest VM. In such a case, deduplication is beneficial, because snapshots in time may share large amounts of common data. For example, instructions 408 may be executed a plurality of times to create a plurality of backup file system instances (e.g., 144-1 through 144-N), and instructions 410 may deduplicate objects against those backup file system instances. The deduplication by instructions 410 may occur inline in conjunction with instructions 408 so as to identify and remove duplicate objects (e.g., encrypted data objects in particular) during the backup process before they are replicated to the backup node such that replication is generally limited to additional encrypted data objects that are not already present on the backup node. Thus the amount of data transferred to the backup node may be reduced, making the backup process more WAN efficient. In other implementations, instructions 410 may perform post-process deduplication on the backup node.

Instructions 412, when executed, cause the processing resource 402 to delete a DEK (e.g., 130) to cryptographically erase any file system instance (e.g., 122), backups (e.g., 144), and series of backups (e.g., 144) contained by and belonging to the security domain (e.g., 124) associated with the DEK. In some implementations, instructions 412 may be triggered by a user request to delete the security domain. In some implementations, execution of instructions 412 instructs other nodes in the cluster to delete their respective copies of the DEK and to provide confirmation. By deleting a DEK, any data objects encrypted by the DEK can no longer be decrypted, thus providing cryptographic erasure of the sensitive data of a security domain.

In some implementations, machine readable medium 404 may be encoded with other instructions, such as instructions to delete a KEK. Because a KEK is exclusive to a particular cluster, deleting the KEK would cause the cryptographic erasure of every security domain associated with that cluster, as well as every file system instance contained by or originating from those security domains.

Figure 5:
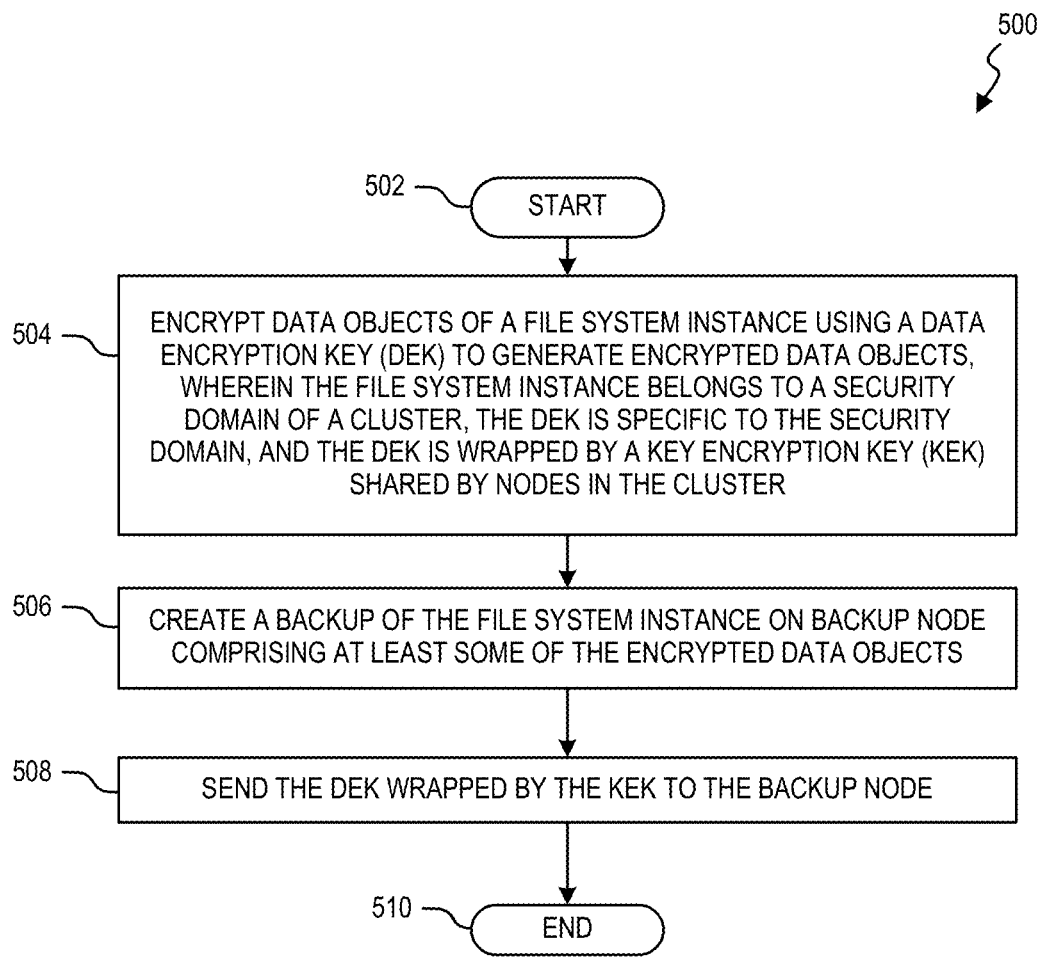
FIG. 5 depicts an example method that includes creating a backup of a file system instance having encrypted data objects.
Figure 6:
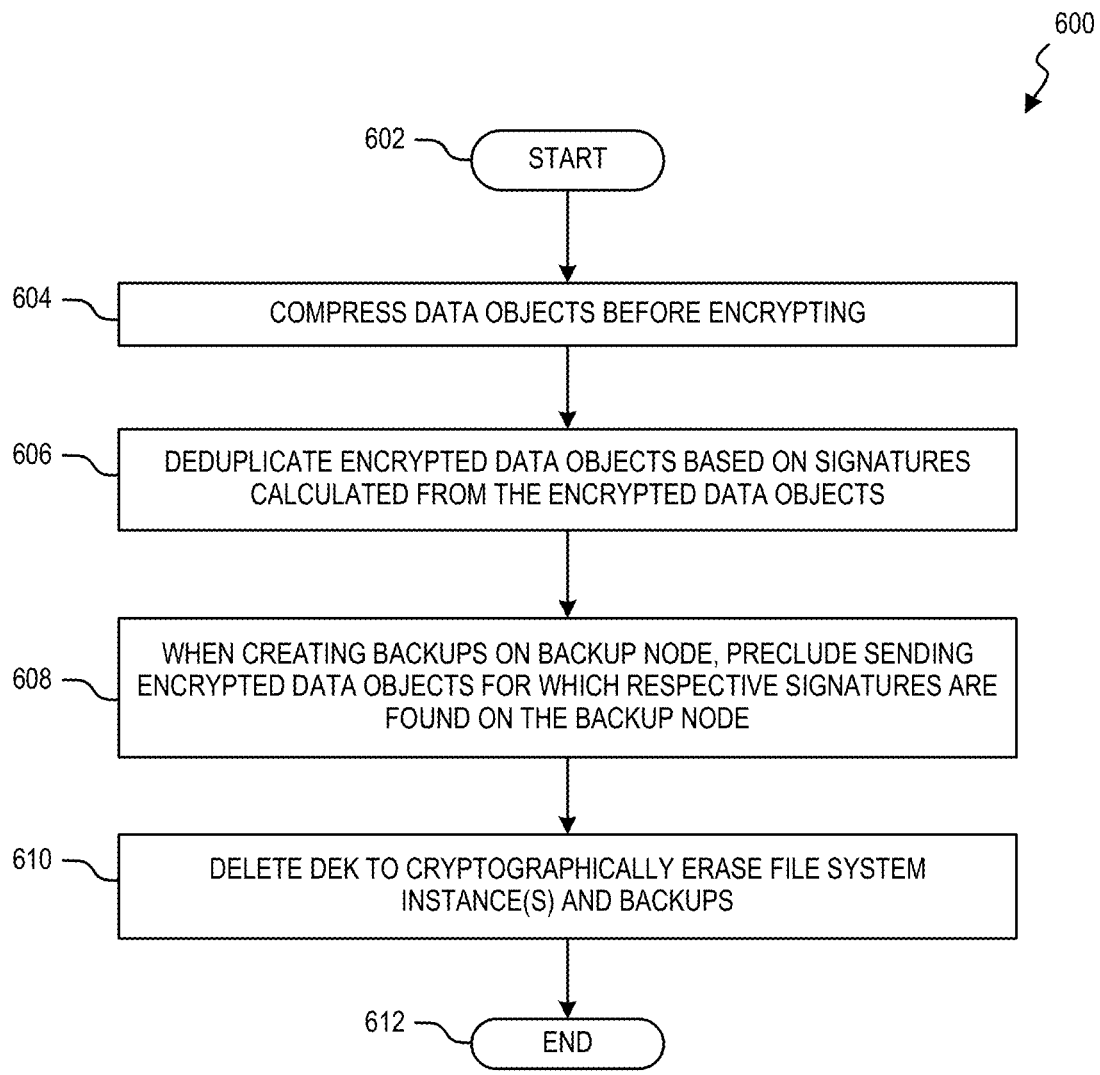
FIG. 6 depicts an example method that includes deleting a Data Encryption Key to cryptographically erase a file system instance and backups.

FIGS. 5 and 6 are flow diagrams depicting various example methods. In some implementations, one or more blocks of the methods may be executed substantially concurrently or in a different order than shown. In some implementations, a method may include more or fewer blocks than are shown. In some implementations, one or more of the blocks of a method may, at certain times, be ongoing and/or may repeat. In some implementations, blocks of the methods may be combined.

The methods shown in FIGS. 5 and 6 may be implemented in the form of executable instructions stored on a machine readable medium (e.g., such as machine readable medium 114, 304, or 404) and executed by a processing resource (e.g., such as processing resource 112, 302, or 402) and/or in the form of electronic circuitry. For example, aspects of the methods may be described below as being performed by a node in a cluster. In some implementations, aspects of the methods may be performed in particular by the data virtualization platform 116, the system 300, or the system 400, described above.

FIG. 5 is a flow diagram depicting an example method 500. Method 500 starts at block 502 and continues to block 504, where a node (e.g., a computing system in a cluster) encrypts data objects of a file system instance using a DEK to generate encrypted data objects. The file system instance belongs to a security domain within a cluster to which the node belongs. The DEK is specific to the security domain, and the DEK is wrapped by a KEK shared exclusively by nodes in the cluster. In some implementations, encrypting a data object may also use an encryption algorithm tweak value, which may be based on a position of the data object within the file system instance (e.g., a position based on inode number, inode tree number, and/or an offset). In some implementations, block 504 may be performed at least in part by executing instructions 306 described above.

The file system instance hierarchically relates the encrypted data objects to a root object based on object signatures. For example, the file system instance may be a Merkle tree similar to the file system instance 200 described above. In an implementation, to form the Merkle tree, signatures may be calculated for the encrypted data objects generated by block 504 and for any internal metadata objects of the Merkle tree until the root object is derived, in a manner described above. Signatures of encrypted data objects and internal metadata objects may be calculated using a cryptographic hash function. In some implementations, the signature of an object, whether an encrypted data object or internal metadata object, may be an HMAC based on a cryptographic hash of the content of that object using the position of that object within the file system instance as a key. Signature calculation may be performed at least in part by executing instructions 406 described above.

At block 506, the node creates a backup of the file system instance on a backup node (e.g., a remote or local backup node). The backup may comprise at least some of the encrypted data objects encrypted at block 504. In some implementations, block 506 may be performed at least in part by executing instructions 308 described above.

At block 508, the node sends the DEK wrapped by the KEK to the backup node. The backup node cannot decrypt the backup unless the backup node is also a member of the same cluster and has access to the KEK to unwrap the DEK. In some implementations, block 508 may be performed at least in part by executing instructions 310 described above. At block 510, method 500 ends.

FIG. 6 is a flow diagram depicting an example method 600. Method 600 starts at block 602 and continues to block 604, where a node compresses a data object before encrypting the data object. For example, in some implementations, a node may perform block 604 before performing block 504.

At block 606, the node deduplicates the encrypted data objects based on signatures calculated from the encrypted data objects. Deduplication may be inline deduplication or post-process deduplication. In some implementations, block 606 may be performed at least in part by executing instructions 406 to calculate signatures and by executing instructions 410 to deduplicate objects. Block 606 may also be performed to deduplicate encrypted objects stored locally on the source node itself (e.g., during a snapshot process).

As described above with reference to instructions 410, data objects having identical unencrypted content but belonging to different file system instances from different security domains are encrypted by different DEKs and are associated with different signatures. Thus, block 606 may not deduplicate the data objects having identical unencrypted content from different security domains, due to those signatures being different.

On the other hand, block 606 may include deduplicating encrypted data objects across file system instances and backups within or from a same security domain. In particular, block 608 may be performed when creating a backup to a backup node (e.g., by performing block 506) to preclude sending encrypted data objects to the backup node when signatures are found on the backup node in a series of backups.

In an example, the node may periodically create snapshots of a file system instance, and each of those snapshots may trigger block 506 described above to be performed to create backups of those file system instance snapshots on the backup node. Thus, block 506 may be performed multiple times (e.g., iterations of method 500) to create a series of backup file system instances on the backup node, where each backup file system instance in the series (e.g., 144-1 through 144-N) is a backup of a corresponding snapshot (e.g., 122-1 through 122-N). Additionally, the series of backups belong to and originate from the same security domain and thus include encrypted data objects that are encrypted using the same DEK. By virtue of performing deduplication at block 608 in conjunction with block 506, creating some of the backups may involve sending only additional encrypted data objects that are not already present on the backup node, including data objects that may have identical unencrypted content as data objects on the backup node but are not in the same position within the file system instance structure, if position is used for encryption and signature generation.

At block 610, a DEK can be deleted to cryptographically erase a file system instance and a series of backups. In some implementations, block 610 may involve instruction all nodes having a copy of the DEK to delete their copy of the DEK. In some implementations, block 610 may be performed by executing instructions 412. Method 600 may end at block 612.

Figure 7:
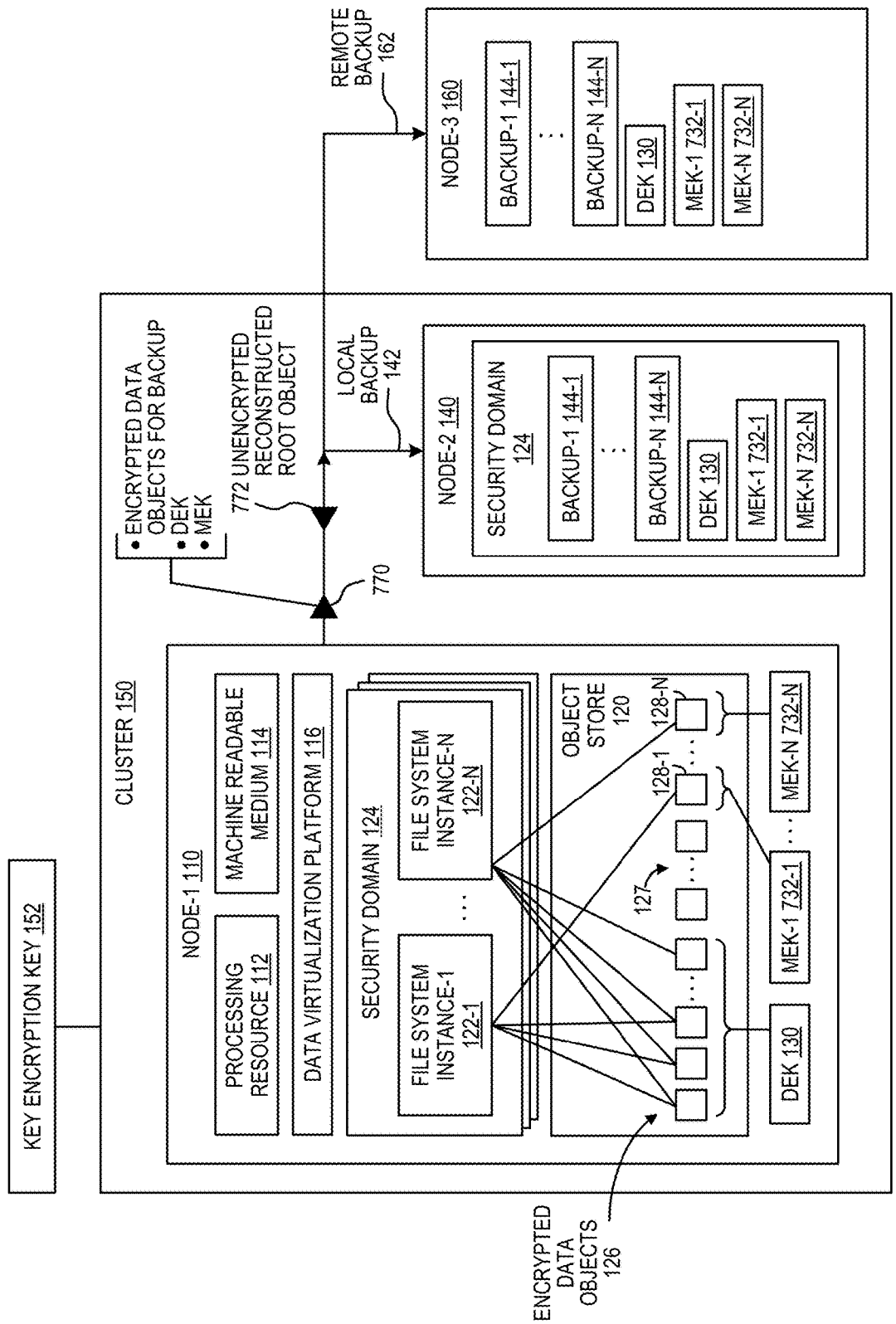
FIG. 7 depicts an example environment where a node may create backups of file system instances with encrypted data objects.

FIG. 7 depicts an example computing environment similar in many respects to the example illustrated in FIG. 1. For example, a node-1 110 may encrypt data objects of file system instances to secure those file system instances and may create backups on local or remote nodes. As previously described, a secure file system instance 122 may comprise some of the encrypted data objects 126 that are hierarchically related up to a root object 128, in a Merkle tree for example.

In an example, each file system instance 122 may correspond to a different snapshot of a guest VM or other type of dataset, and each file system instance may be identified by a different corresponding root object 128. Moreover, each root object 128 may be encrypted using a different respective Metadata Encryption Key (MEK). For example, a first root object-1 128-1 may be encrypted using a first MEK-1 732-1 and a second root object-2 128-2 (N=2 on FIG. 7) may be encrypted using a second MEK-2 732-2. Thus, MEKs are specific to an associated root object. In some implementations, even if two file system instances 122 are the same, such as when no changes are made to the data between two snapshots, different MEKs would be used to encrypt the root objects of those two file system instances. In some implementations, encrypted root objects may be persisted in a separate storage medium apart from other metadata objects or data objects.

A MEK may be a 512-bit XTS-AES-256 key and may be generated, in some implementations, by the data virtualization platform 116 (e.g., at a control plane the data virtualization platform 116). The MEKs 732-1 through 732-N (generally or collectively MEK(s) 732) are wrapped by the DEK 130 of the security domain 124 containing the file system instances 122 having root objects 128 encrypted by the MEKs 732. In this manner, a security domain may be associated with a single DEK and multiple MEKs.

The node-1 110 may create a backup 144 of a file system instance 122 to a backup node such as a local node-2 140 within the same cluster 150 or to a remote node-3 160 outside the cluster 150. The node-1 110 may send 770 the DEK 130 (wrapped by KEK 152) and the MEK 732 (wrapped by DEK 130) corresponding to the file system instance being backed up to the backup node. For example, as part of the backup process of file system instance-N 122-N, node-1 110 may replicate 770 at least some of the encrypted data objects 126 to the backup node (e.g., encrypted data objects that are not subject to deduplication) and may send 770 MEK-N 732-N. As depicted in FIG. 7, the backup nodes 140, 160 may store DEK 130, MEK-1 732-1, and MEK-N 732-N, for example.

In some implementations, the backup process does not send the root object-N 128-N or other internal metadata objects 127 (e.g., metadata objects between the root object and encrypted data objects at a leaf level), but instead the backup node may reconstruct the backup file system instance 144-N up to a reconstructed root object based on encrypted data objects that are received from the node-1 110 or are already resident on the backup node (e.g., if deduplicated). The backup node may send the reconstructed root object 772 to the source node, node-1 110, for verification, as will be described below with reference to FIGS. 9 and 11.

Example implementations supporting cryptographic erasure of a selected backup will now be described in FIGS. 8-12. In some implementations, the functionality described herein may be implemented as instructions stored on machine readable medium 114 and executed by the processing resource 112, and more particularly, may be functionality of the data virtualization platform 116. Example implementation details may be described with reference back to FIGS. 2 and 7.

Figure 8:
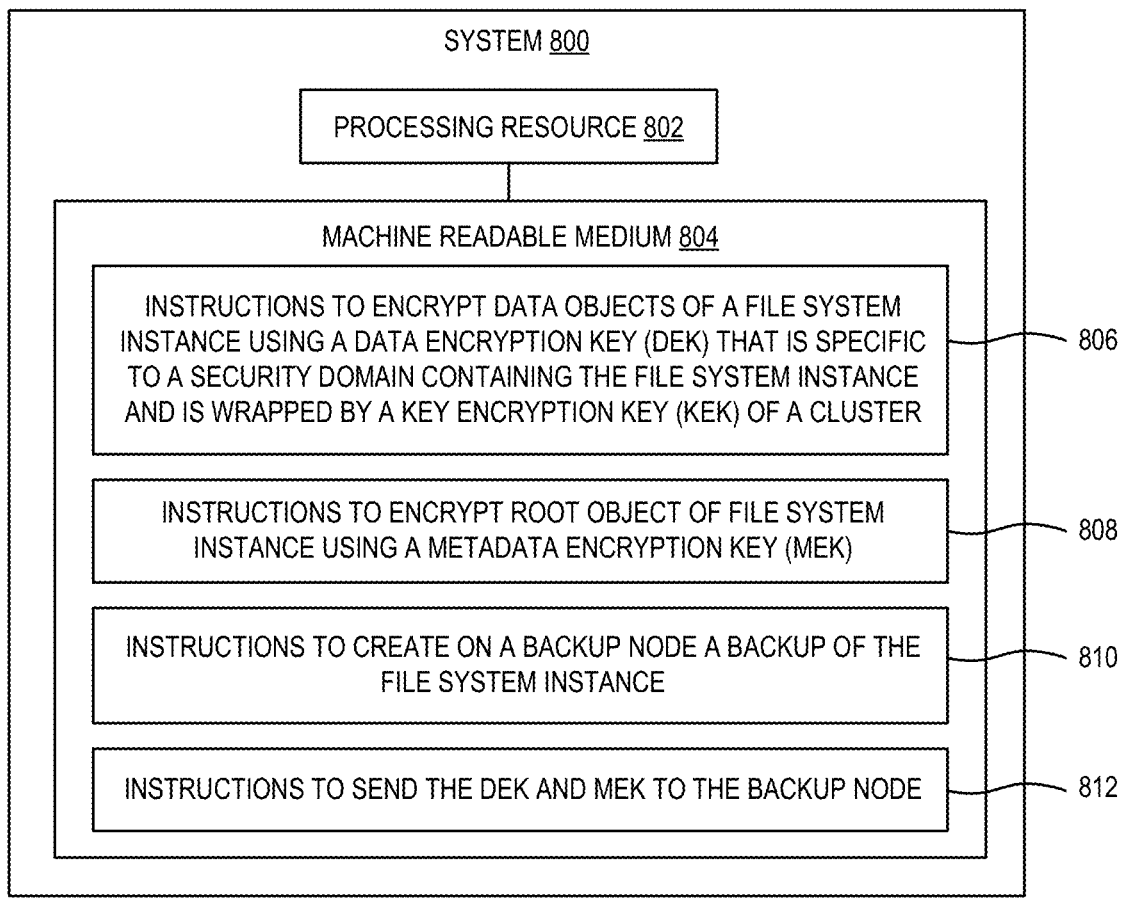
FIG. 8 depicts an example system with a machine readable medium that includes instructions to encrypt a root object of the file system instance using a Metadata Encryption Key and to create a backup of the file system instance.

FIG. 8 depicts an example system 800 with a machine readable medium 804 encoded with instructions 806, 808, 810, 812 that are executable by a processing resource 802. System 800 may serve as or form part of node-1 110. The system 800 may belong to a cluster, such as cluster 150 of FIG. 1. The processing resource 802 and the machine readable medium 804 may be analogous in many respects to the processing resource 112 and the machine readable medium 114. The machine readable medium 804 may be non-transitory.

Instructions 806, when executed, cause the processing resource 802 to encrypt data objects of a file system instance to generate encrypted data objects using a DEK specific to a security domain containing the file system instance. Instructions 806 may share similarities with instructions 306 described above. The DEK is wrapped by a KEK shared exclusively within a cluster to which the system 800 belongs. The file system instance hierarchically relates the encrypted data objects (e.g., 126) located at a leaf level to a root object (e.g., 128-1) through references to signatures of the encrypted data objects. For example, the file system instance may resemble file system instance 200, where data objects 204 are related hierarchically in a Merkle tree to the root object 202. Signatures may be generated by performing instructions 406 described above, for example.

Instructions 808, when executed, cause the processing resource 802 to encrypt the root object (e.g., 128-1) using a Metadata Encryption Key (MEK, e.g., 732-1). The MEK may be wrapped by the DEK and may be specific to the root object.

Instructions 810, when executed, cause the processing resource 802 to create a backup (e.g., 144-1) of the file system instance on another computing system, such as a backup node (e.g., 140 or 160). Instructions 810 may share similarities with instructions 308 described above. In some implementations, instructions 810 may be executed in conjunction with instructions 410 to deduplicate the backup as described above.

Instructions 812, when executed, cause the processing resource 802 to send the DEK (e.g., 130) and the MEK (e.g., 732-1) to the backup node, together with the backup (e.g., 144-1). Instructions 806, 808, 810, 812 may be executed multiple times, such as with each snapshot of a guest VM, thus creating a series of backups (e.g., 144) of file system instances (e.g., 122) identified by respective root objects (e.g., 128) encrypted by corresponding MEKs (e.g., 732).

In some implementations, the system 800 may be replicating data changes (e.g., of guest VM data) to the backup node on an ongoing basis, for high availability purposes for example. The ongoing replication may involve sending encrypted data objects to the backup node as they are written or modified on the system 800. In such instances, instructions 810 to create a backup may involve the system 800 creating a snapshot file system instance (e.g., 122-N) of the data and instructing the backup node to create a backup of the snapshot file system instance (e.g., 144-N) based on the data changes that were replicated on an ongoing basis since a last backup (e.g., 144-(N−1)). As part of creating a backup, the backup node may generate a root object for the backup hierarchically related to signatures of the data changes and other encrypted data objects in the backup and may encrypt the root object with a MEK specific to the backup and snapshot file system instances. The system 800 and backup node may coordinate, at a control plane level for example, to ensure that the same MEK is used to encrypt the root objects of the snapshot file system instance and the corresponding backup.

Figure 9:
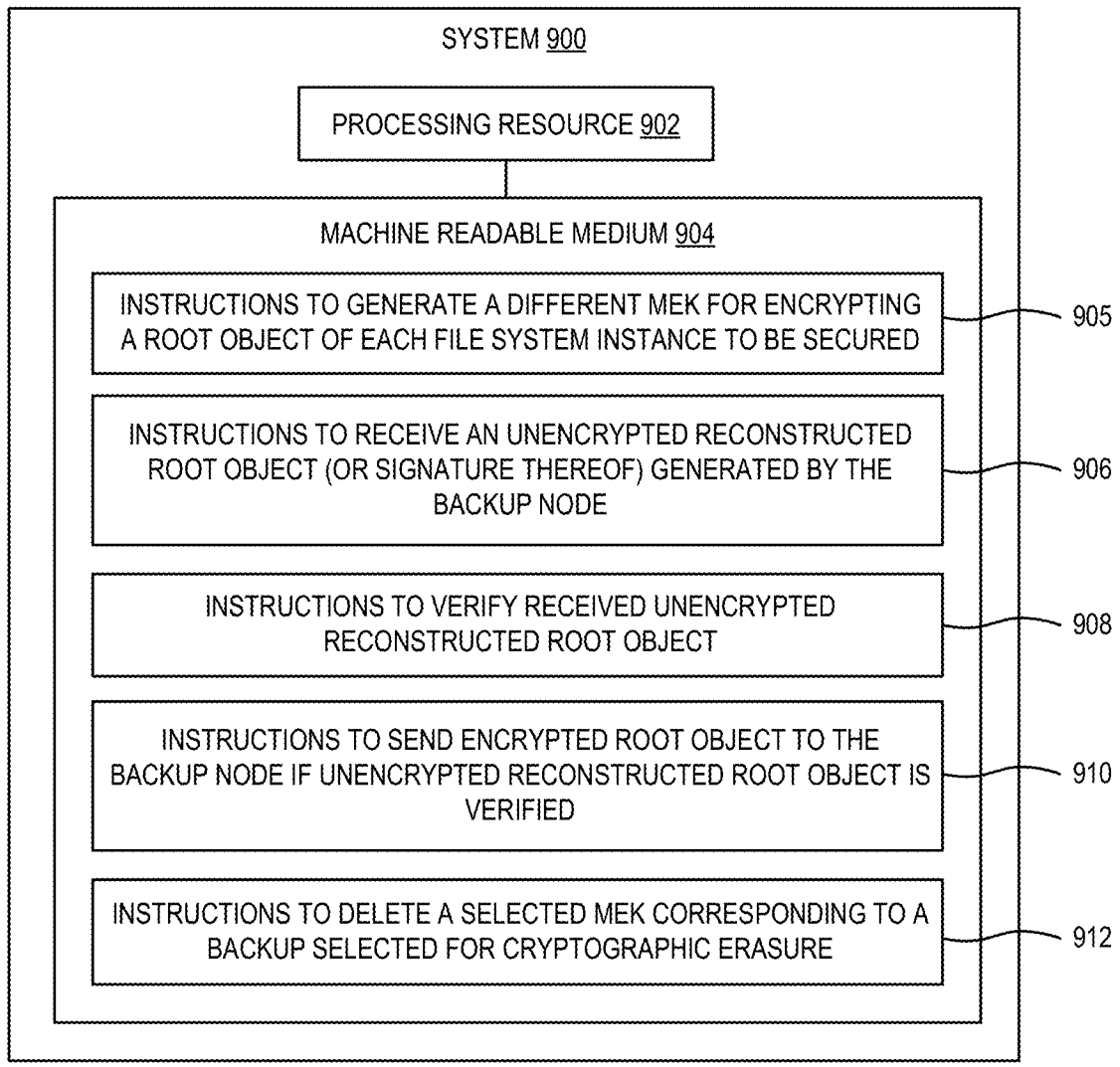
FIG. 9 depicts an example system with a machine readable medium that includes instructions to verify an unencrypted reconstructed root object and instructions to delete a Metadata Encryption Key to cryptographically erase a selected backup.

FIG. 9 depicts an example system 900 with a machine readable medium 904 encoded with instructions 905, 906, 908, 910, 912 that are executable by a processing resource 902. System 900 may serve as or form part of node-1 110. In some implementations, the instructions of system 900 may be implemented in combination with instructions of system 800. System 900 may belong to a cluster, such as cluster 150 of FIG. 1. The processing resource 902 and the machine readable medium 904 may be analogous in many respects to the processing resource 112 and the machine readable medium 114. The machine readable medium 904 may be non-transitory.

Instructions 905, when executed, may cause the processing resource 902 to generate a different MEK to encrypt a root object of each different file system instance to be secured. For example, each time a snapshot is made of guest VM data, a new file system instance (e.g., 122) may be created and a new MEK (e.g., 732) may be generated by instructions 905 to encrypt the root object (e.g., 128) of that new file system instance. In some implementations, instructions 905 may form part of a control plane of a data virtualization platform (e.g., 116).

Instructions 906, 908, 910 may be useful for verifying reconstruction of a secure backup on a backup node, and in particular, reconstruction on a remote backup node. For example, a backup process may send only encrypted data objects (e.g., 126, 204, 210, or 211) of a file system instance but not a root object (e.g., 128 or 202) or any internal metadata objects (e.g., 127, 206, 208, etc.) to a backup node (e.g., 140 or 160), as an optimization to reduce network traffic. The backup node can then reconstruct a hierarchical file system instance, such as a Merkle tree, by calculating signatures for objects at each level (starting at leaf level), including those signatures in a parent object, and repeating the process until the root object (e.g., 202) is reached. Signature calculation may be performed by executing instructions 406 described above. Thus, a reconstructed root object will have in its content the signatures of its child objects. However, in a remote backup (e.g., 162), a remote node (e.g., 160) may not have access to the KEK (e.g., 152) to unwrap the DEK (e.g., 130), and thus the MEK (e.g., 732-1) cannot be unwrapped and used to encrypt the reconstructed root object.

Instructions 906, when executed, may cause the processing resource 902 to receive an unencrypted reconstructed root object sent (e.g., 772) from a backup node (e.g., 140 or 160). Alternatively or additionally, instructions 906 may receive a signature of the unencrypted reconstructed root object from the backup node.

Instructions 908, when executed, may cause the processing resource 902 to verify the unencrypted reconstructed root object against a corresponding root object. For example, the unencrypted reconstructed root object may be associated a given backup (144-1) that is a backup of a corresponding file system instance (e.g., 122-1) on the system 900. The system 900, as the source system that initiated the backup, may decrypt an associated root object (e.g., 128-1) of that file system instance (e.g., on object store 120) and compare that unencrypted root object (e.g., 128-1) against the received unencrypted reconstructed root object. The comparison may include comparing hash-based signatures or checksums of both the unencrypted reconstructed root object and the decrypted root object or any other type of data comparison. A match between the unencrypted reconstructed root object from the backup node and the decrypted root object from the system 900 (i.e., the source node) signifies that the verification is successful, while a mismatch signifies that the verification is unsuccessful.

If the verification is not successful, then the system 900 may issue an error message. An unsuccessful verification may indicate that the backup has failed. If the verification is successful, instructions 910 may be executed to cause the processing resource 902 to send the MEK-encrypted root object to the backup node for storage. For example, the backup node may replace the unencrypted root object with the encrypted root object received from the system 900, and the backup file system instance will subsequently be identified and referenced via the encrypted root object.

Instructions 912, when executed, may cause the processing resource 902 to delete a selected MEK corresponding to a backup selected for cryptographic erasure. In some implementations, instructions 912 may include coordinating or instructing any node storing a copy of the selected MEK to delete their respective copies of the selected MEK and to provide confirmation.

For example, user input may be received by the system 900 indicating a file system instance (e.g., 122-1), and a corresponding backup (e.g., 144-1) by association, is to be cryptographically erased. The system 900 can identify the MEK (e.g., 732-1) associated with the root object (e.g., 128-1) that identifies the selected file system instance. The selected file system instance (e.g., 122-1) and backup (e.g., 144-1) may be among a plurality of file system instances (e.g., 122) and backups (e.g., 144), and the selected MEK (732-1) may be among a plurality of different respective MEKs (e.g., 732). As described above, the file system instances (e.g., 122) and backups (e.g., 144) of file system instances are identified by respective root objects (e.g., 128) that are encrypted using different respective MEKs (e.g., 732). Thus, by deleting a selected MEK, the corresponding root object cannot be decrypted and is rendered cryptographically inaccessible. The corresponding file system instance and backup can no longer be accessed, since a hierarchical tree-based file system instance is traversed starting from the root object. At the same time, other file system instances and backups associated with the same security domain remain undisrupted.

More particularly, because back pointer signatures are not stored in metadata objects of the file system instances and backups, rendering an encrypted root object cryptographically inaccessible prevents a cryptographically erased file system instance or backup from being reconstructed in implementations where object position is used to calculate HMAC signatures for objects of the file system instance. By contrast, if position where not used in signature calculation, it could be possible to reconstruct a file system instance by calculating data object signatures and matching those signatures to signatures stored in metadata objects. However, the tree structure is not made available in some implementations and thus keys are not available to recalculate the correct HMAC signatures.

Figure 10:
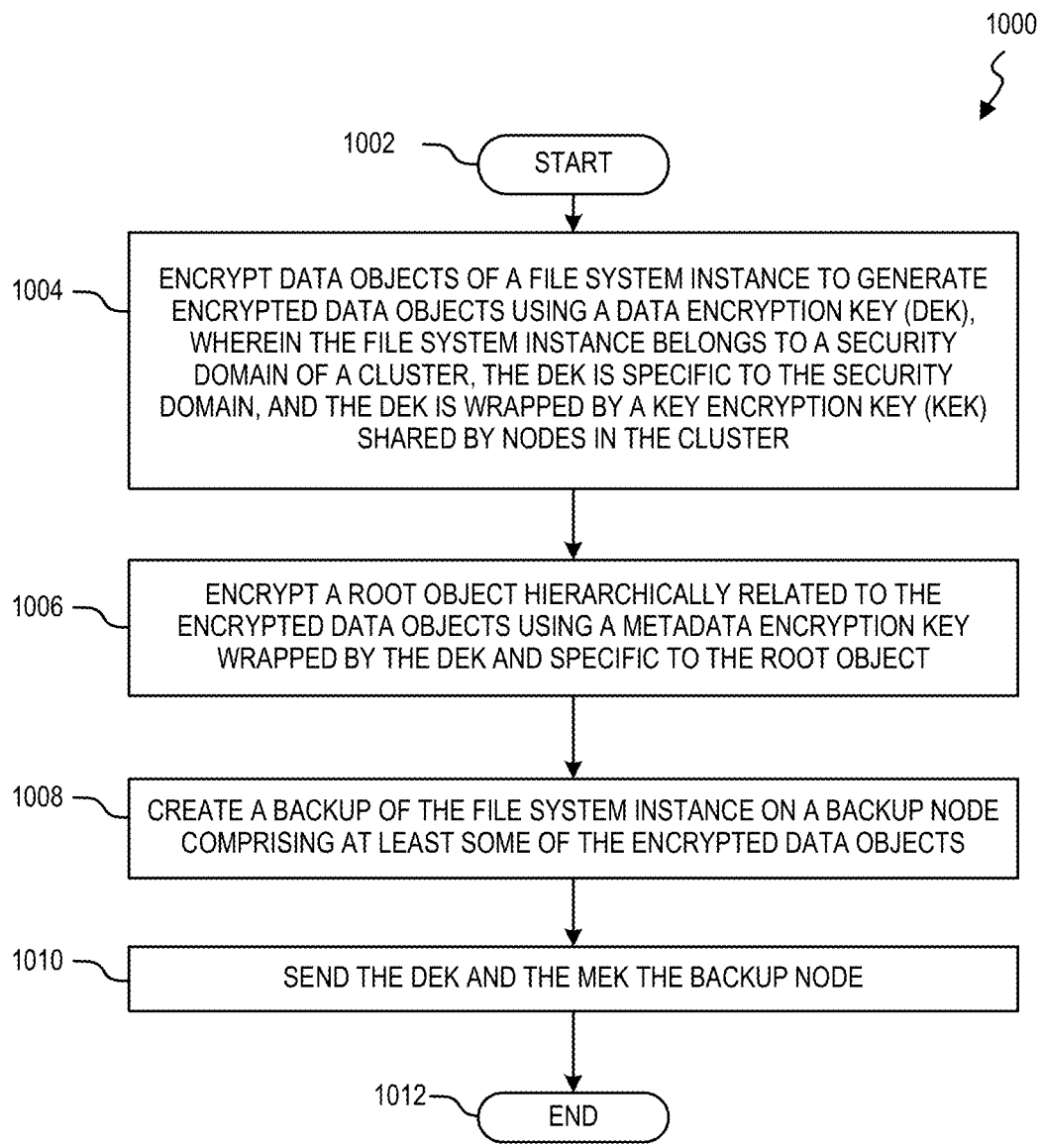
FIG. 10 depicts an example method that includes encrypting a root object using a Metadata Encryption Key.
Figure 11:
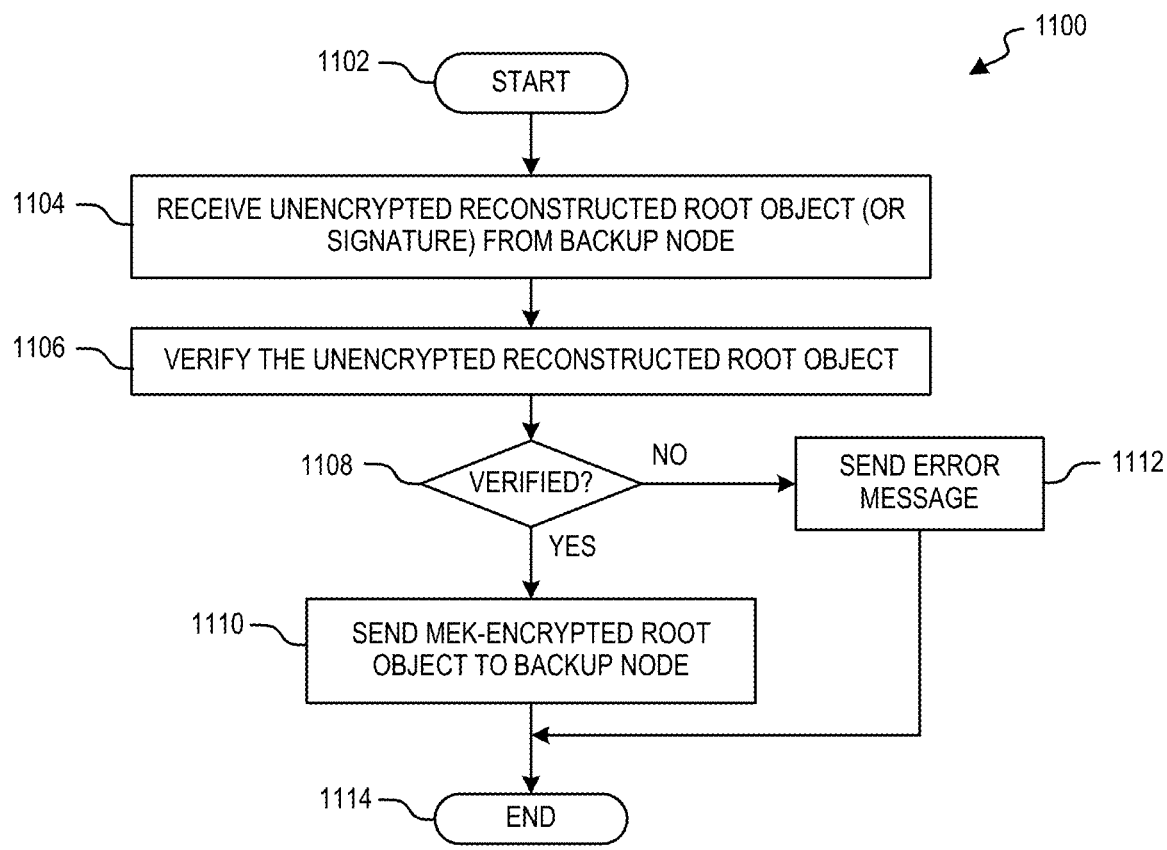
FIG. 11 depicts an example method that includes verifying a reconstructed root object.
Figure 12:
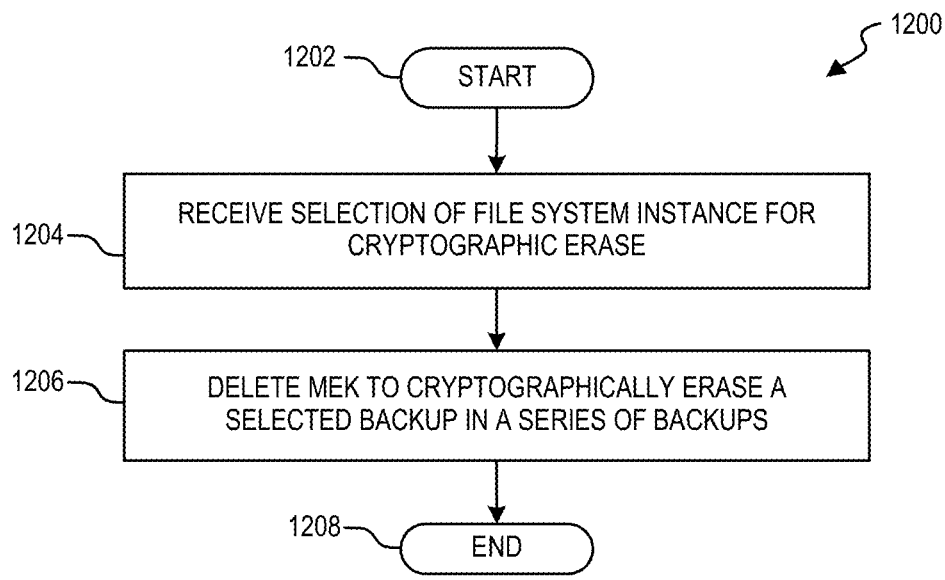
FIG. 12 depicts an example method that includes deleting a Metadata Encryption Key to cryptographically erase a selected file system instance and backup.

FIGS. 10-12 are flow diagrams depicting various example methods. In some implementations, one or more blocks of a method may be executed substantially concurrently or in a different order than shown. In some implementations, a method may include more or fewer blocks than are shown. In some implementations, one or more of the blocks of a method may, at certain times, be ongoing and/or may repeat. In some implementations, blocks of FIGS. 10-12 may be combined.

The methods may be implemented in the form of executable instructions stored on a machine readable medium (e.g., such as machine readable medium 114, 804, or 904) and executed by a processing resource (e.g., such as processing resource 112, 802, or 902) and/or in the form of electronic circuitry. For example, aspects of the methods may be described below as being performed by a node in a cluster. In some implementations, aspects of the methods may be performed in particular by the data virtualization platform 116, the system 800, or the system 900, described above.

FIG. 10 is a flow diagram depicting an example method 1000. Method 1000 starts at block 1002 and continues to block 1004, where a node (e.g., a computing system in a cluster) encrypts data objects of a file system instance to generate encrypted data objects using a DEK specific to a security domain containing the file system instance. The DEK is wrapped by a KEK shared exclusively by nodes in cluster. The file system instance hierarchically relates the encrypted data objects located at a leaf level to a root object through references to signatures of the encrypted data objects. For example, the file system instance may be a Merkle tree similar to the file system instance 200 described above. In some implementations, block 1004 may be performed at least in part by executing instructions 806 described above.

At block 1006, the node encrypts the root object using a MEK to generate an encrypted root object. The MEK is wrapped by the DEK and is specific to the root object. In some implementations, block 1006 may be performed at least in part by executing instructions 808 described above.

At block 1008, the node creates a backup of the file system instance on a backup node by replicating at least some of the encrypted data objects to the backup node. In some implementations, the backup may be deduplicated. In some implementations, block 1008 may be performed at least in part by executing instructions 810 described above.

At block 1010, the node sends the DEK that is wrapped by the KEK and the MEK that is wrapped by the DEK to the backup node with the backup. In some implementations, block 1010 may be performed at least in part by executing instructions 812 described above. The method 1000 ends at block 1012.

In an illustration, at least some blocks of method 1000 may be performed multiple times to create a series of backup file system instances on the backup node. For example, a first file system instance (e.g., 122-1) may be secured by encrypting data objects thereof using a DEK (e.g., 130) by performing block 1004, and a first root object (e.g., 128-1) of the first file system instance may be encrypted by a first MEK (e.g., 732-1) by performing block 1006. A first backup (e.g., 144-1) may be created by performing block 1008, and the DEK and first MEK may be sent (e.g., 770) to a backup node (e.g., 140 or 160) by performing block 1010. At a later point in time, a second file system instance (e.g., 122-2) may be generated, by a snapshot for example. The second file system instance may include additional data objects not present in the first file system instance, and those additional data objects may also be encrypted using the same DEK (e.g., 130) by performing block 1004. A second root object (e.g., 128-2) may be generated for the second file system instance by calculating signatures up through a Merkle tree, and the second root object may be encrypted by performing block 1006 using a second MEK (e.g. 732-2) that is different from the first MEK. A second backup (e.g., 144-2) may be created on the backup node by performing block 1008, and the DEK and second MEK may be sent to the backup node by performing block 1010. Both the first backup and the second backup are contained by or originate from the same security domain. A signature of the encrypted first root object is different from a signature of the encrypted second root object by virtue of at least being encrypted by different MEKs, if not also due to different data content in the respective file system instances.

FIG. 11 is a flow diagram depicting an example method 1100. Method 1100 starts at block 1102 and continues to block 1104, where a node (e.g., a source node that previously initiated a backup, such as node-1 110) receives, from a backup node (e.g., 140 or 160), an unencrypted reconstructed root object or a signature of the unencrypted reconstructed root object (e.g., 772). In particular, the backup node is not a member of the cluster that the receiving node is a member of, and the unencrypted reconstructed root object is generated by the backup node based on encrypted data objects of a backup. For example, the unencrypted reconstructed root object may be generated in a manner described above, with respect to FIG. 2 for example. Block 1104 may be performed by executing instructions 906 for example.

At block 1106, the node may verify the unencrypted reconstructed root object against a root object. For example, verifying may include decrypting the root object at the source node and comparing the decrypted root object to the received unencrypted reconstructed root object (e.g., a signature comparison). In some implementations, block 1106 may be performed by executing instructions 908 described above. Verification is successful if the decrypted root object and the unencrypted reconstructed root object match.

If the verifying is successful ("YES" at block 1108), method 1100 proceeds to block 1110, where the source node may send the encrypted root object (e.g. 128-1) to the backup node. The backup node may persist the encrypted root object, which may include using the encrypted root object to identify the file system instance on the backup node. In some implementations, block 1108 may be performed by executing instructions 910. If the verifying is unsuccessful ("NO" at block 1108), method 1100 proceeds to block 1112, where the source node and/or backup node may return an error message. Method 1100 may end at block 1114.

FIG. 12 is a flow diagram depicting an example method 1200. Method 1200 starts at block 1202 and continues to block 1204, where a node receives a selection of a file system instance to be cryptographically erased. The node receiving the selection may be a node that either stores or manages the selected file system instance or a backup thereof. The receiving node may transmit instructions indicating that the selected file system instance is to be cryptographically erased to other nodes that may either store or manage the selected file system instance or a backup thereof. The receiving node may identify a selected MEK that corresponds to the selected file system instance. The selected MEK may be among a plurality of different MEKs that encrypted respective root objects of a plurality of different file system instances and backups thereof.

At block 1206, the node may delete the selected MEK to cryptographically erase the selected file system instance and any associated backup of the selected file system instance, without affecting, modifying, or otherwise disrupting any other file system instance or backups associated with the same security domain. To illustrate with reference to FIG. 7, MEK 732-1 may be deleted to cryptographically erase file system instance 122-1 and backup-1 144-1. In some implementations, block 1206 may be performed by executing instructions 912 described above. Method 1200 may end at block 1208.

In some implementations, systems described herein (e.g., node-1 110, systems 300, 400, 800, 900) may include additional functionality, which may be implemented as instructions encoded on a non-transitory machine readable medium executable by a processing resource. For example, the machine readable medium may include instructions to decrypt a backup file system instance using an associated DEK and MEK. The instructions to decrypt a backup may include instructions to unwrap the DEK using a KEK that is available to a system by virtue of the cluster membership(s) of the system and to unwrap the MEK using the unwrapped DEK. If the system is not a member of the cluster associated with the KEK, then the DEK cannot be unwrapped and decryption will fail. On the other hand, if DEK and MEK unwrapping are successful, control may pass to instructions to use the unwrapped MEK to unencrypt a root object of the backup. The unencrypted root object can be used by the data virtualization platform to traverse the file system instance to reach encrypted data objects at the leaf level. Decryption may be useful in various read or restore scenarios. For example, specific encrypted data objects may be addressed by a read request (e.g., addressed by inode and subtree offset). As another example, the data virtualization platform may be restoring a part or the whole of the backup file system instance. The encrypted data objects may be decrypted using the DEK.

In some cases, the system may be attempting to restore a backup file system instance to a different security domain. In such a case, the system may execute instructions to unwrap the DEK (and MEK if applicable) using the KEK and decrypt the backup file system instance. Then, the decrypted backup file system instance or a copy thereof (i.e., via a deep copy) may be reencrypted using a different DEK associated with the different security domain.

In some cases, the system may be attempting to restore a backup file system instance of a foreign cluster, that is, a cluster of which the system is not a member. In this example, the system may be deemed a remote node relative to the foreign cluster, which may also be deemed the source cluster in this instance. In such cases, the system may not have access to the KEK associated with the foreign cluster to unwrap a DEK associated with that backup file system instance. The system may execute instructions to send the wrapped DEK back to the foreign cluster and request access to the backup file system instance. The foreign cluster may authenticate the system and authorize the system to access the backup file system instance. If the system is authenticated and authorized, the foreign cluster may unwrap the DEK using the KEK of the foreign cluster and return to the system the unwrapped DEK encrypted using a public key of the system. The system may then execute instructions to decrypt the DEK using a private key and then execute instructions to rewrap the decrypted DEK using a KEK available to the system (i.e., a KEK of the cluster to which the system belongs). The system may now have access to the backup file system instance. In some implementations, the system may execute instructions to perform a deep copy of the backup file system instance to create a new file system instance (i.e., copying all decrypted data objects and copying or recreating the metadata objects referencing the decrypted data objects) and encrypt the new file system instance using a new DEK wrapped under the KEK available to the system. In this manner, the system may copy a backup file system instance of a foreign cluster into a new security domain in a cluster to which the system belongs.

In the foregoing description, numerous details are set forth to provide an understanding of the subject matter disclosed herein. However, implementation may be practiced without some or all of these details. Other implementations may include modifications, combinations, and variations from the details discussed above. It is intended that the following claims cover such modifications and variations.

What is claimed:

1. A system belonging to a cluster, the system comprising:
    a processing resource; and
    a machine readable medium storing instructions that, when executed by the processing resource, cause the processing resource to:
        encrypt data objects of a file system instance to generate encrypted data objects using a data encryption key (DEK) specific to a security domain containing the file system instance, the DEK being wrapped by a key encryption key (KEK) shared exclusively within the cluster, and the file system instance hierarchically relating the encrypted data objects located at a leaf level to a first root object through references to signatures of the encrypted data objects,
        encrypt the first root object using a first metadata encryption key (MEK),
        create on a node a backup of the file system instance comprising at least some of the encrypted data objects, and
        send the DEK and the first MEK to the node with the backup.

2. The system of claim 1, wherein the first MEK is wrapped by the DEK and is specific to the first root object.

3. The system of claim 1, wherein the machine readable medium stores instructions to cause the processing resource to:
    create a second backup of the file system instance on the node, the second backup contained by the security domain and including additional encrypted data objects that are encrypted using the DEK and a second root object different from the root object, and
    encrypt the second root object using a second MEK different from the first MEK.

4. The system of claim 1, wherein backups of file system instances within the security domain are identified by respective root objects that are encrypted using different respective MEKs, and
    the machine readable medium stores instructions that cause the processing resource to delete a selected MEK, from among the different respective MEKs, corresponding to a backup, from among the backups, selected for cryptographic erasure.

5. The system of claim 1, wherein the data objects encrypted by the processing resource include an inode attribute data object or an inode extended attribute data object of the file system instance.

6. The system of claim 1, wherein the instructions cause the processing resource to encrypt the data objects using the DEK and respective tweak values that are based on positions of the data objects in the file system instance, and
    the signatures are calculated as hash-based message authentication codes of respective encrypted data objects using the positions of the respective encrypted data objects as a key.

7. The system of claim 5, wherein the positions are based on at least one of an inode number, inode tree number, and an offset.

8. The system of claim 1, wherein internal metadata objects within the file system instance are unencrypted.

9. A method comprising:
    encrypting, by a processing resource of a node in a cluster, data objects of a file system instance to generate encrypted data objects using a data encryption key (DEK) specific to a security domain containing the file system instance, the DEK being wrapped by a key encryption key (KEK) shared exclusively within the cluster, and the file system instance hierarchically relating the encrypted data objects located at a leaf level to a first root object through references to signatures of the encrypted data objects;
    encrypting, by the processing resource, the first root object using a first metadata encryption key (MEK) that is wrapped by the DEK and is specific to the first root object to generate an encrypted first root object;
    creating, by the processing resource, a backup of the file system instance on another node comprising at least some of the encrypted data objects; and
    sending the DEK and the first MEK to the other node with the backup.

10. The method of claim 9, comprising:
    creating a second backup file system instance on the other node, the second backup contained by the security domain and including additional encrypted data objects that are encrypted using the DEK and a second root object different from the first root object; and
    encrypting the second root object using a second MEK different from the first MEK.

11. The method of claim 9, wherein backups of file system instance within the security domain are identified by respective encrypted root objects that are encrypted using different respective MEKs, and
    the method comprising deleting a selected MEK, from among the different respective MEKs, corresponding to a backup, from among the backups, selected for cryptographic erasure.

12. The method of claim 9, comprising:
  receiving, from the other node, an unencrypted reconstructed root object or a signature of the unencrypted reconstructed root object, wherein the other node is not a member of the cluster, and the unencrypted reconstructed root object is generated by the other node based on encrypted data objects of the backup;
  verifying the unencrypted reconstructed root object against the first root object; and
  responsive to the unencrypted reconstructed root object being verified, sending the encrypted first root object to the other node for persisting at the other node.

13. The method of claim 9, wherein the encrypting data objects includes encrypting the data objects using the DEK and respective tweak values that are based on positions of the data objects in the file system instance, and
  the signatures are calculated as hash-based message authentication codes of respective encrypted data objects using the positions of the respective encrypted data objects as a key.

14. The method of claim 13, wherein the positions are based on an inode number, inode tree number, and an offset.

15. A non-transitory machine readable medium storing instructions executable by processing resource of a computing system, the non-transitory machine readable medium comprising:
  instructions to encrypt data objects of a file system instance to generate encrypted data objects using a data encryption key (DEK) specific to a security domain containing the file system instance, the DEK being wrapped by a key encryption key (KEK) shared exclusively within a cluster to which the computing system belongs, and the file system instance hierarchically relating the encrypted data objects located at a leaf level to a first root object through references to signatures of the encrypted data objects;
  instructions to encrypt the first root object using a first metadata encryption key (MEK) that is wrapped by the DEK and is specific to the first root object;
  instructions to create a backup of the file system instance on another computing system comprising at least some of the encrypted data objects; and
  instructions to send the DEK and the first MEK to the other computing system with the backup.

16. The non-transitory machine readable medium of claim 15 comprising:
  instructions to generate a different MEK to encrypt a root object of each different file system instance being secured.

17. The non-transitory machine readable medium of claim 15, wherein backups of the file system instances are identified by respective root objects that are encrypted using different respective MEKs, and
  the non-transitory machine readable medium comprises instructions to delete a selected MEK, from among the different respective MEKs, corresponding to a backup, from among the backups, selected for cryptographic erasure.

18. The non-transitory machine readable medium of claim 15, wherein the data objects encrypted to generate encrypted data objects includes inode attribute data objects and inode extended attribute data objects of the file system instance, and
  wherein internal metadata objects within the file system instance are unencrypted.

19. The non-transitory machine readable medium of claim 15, wherein the instructions to encrypt data objects causes the processing resource to encrypt the data objects using the DEK and respective tweak values that are based on positions of the data objects in the file system instance, and
  the signatures are calculated as hash-based message authentication codes of respective encrypted data objects using the positions of the respective encrypted data objects as a key.

20. The non-transitory machine readable medium of claim 19, wherein the positions are based on an inode number, inode tree number, and an offset.

* * * * *